United States Patent
Gordon et al.

(10) Patent No.: US 7,004,315 B2
(45) Date of Patent: Feb. 28, 2006

(54) MEDALLION PACKAGING DEVICE FOR DISC-SHAPED ITEMS AND RELATED MATERIALS AND METHOD FOR PACKAGING SUCH DISCS AND MATERIAL

(75) Inventors: Alexandra Gordon, Bedford, NY (US); Charles W. Grimes, Darien, CT (US); William L. Plumb, Piermont, NY (US)

(73) Assignee: Avecmedia, Inc., Norwalk, CT (US)

( * ) Notice: Subject to any disclaimer, the term of this patent is extended or adjusted under 35 U.S.C. 154(b) by 114 days.

(21) Appl. No.: 10/219,358

(22) Filed: Aug. 15, 2002

(65) Prior Publication Data

US 2003/0062272 A1   Apr. 3, 2003

Related U.S. Application Data

(63) Continuation-in-part of application No. 09/916,870, filed on Jul. 27, 2001, now Pat. No. 6,561,345, which is a continuation-in-part of application No. 09/565,342, filed on May 5, 2000, now Pat. No. 6,349,821, which is a continuation-in-part of application No. 09/161,064, filed on Sep. 25, 1998, now Pat. No. 6,216,857.

(51) Int. Cl.
*B65D 85/57* (2006.01)

(52) U.S. Cl. .................. 206/232; 53/471; 53/474; 206/308.1; 224/220; 224/604; 224/674

(58) Field of Classification Search .............. 53/471, 53/474; 206/216, 217, 232, 303, 307, 308.1, 206/310; 215/227, 228; 220/212, 256, 258, 220/501, 503, 521, 522; 224/601, 604, 220, 224/674

See application file for complete search history.

(56) References Cited

U.S. PATENT DOCUMENTS

| | | | | |
|---|---|---|---|---|
| 4,535,888 A | * | 8/1985 | Nusselder | 206/311 |
| 6,070,752 A | * | 6/2000 | Nava et al. | 220/521 |
| 6,196,411 B1 | * | 3/2001 | Nava et al. | 220/521 |

* cited by examiner

*Primary Examiner*—Jim Foster
(74) *Attorney, Agent, or Firm*—Grimes & Battersby, LLP

(57) ABSTRACT

A device for packaging at least one disc-shaped item together with other materials comprising a pair of complementary container elements attached by means of an interlocking mechanism such as a hinge, such that said complementary container elements are in a mating top and bottom configuration. The container has an open position in which the complementary container elements are separated, and a closed position in which the complementary container elements engaged each other and cooperate to form a cavity therebetween. The container elements include means for retaining the container in a closed position such that the chamber formed thereby is relatively insulated. A sealing member may also be provided to cover said opening, which sealing member must be removed to provide access to the opening. Alternatively, the sealing member may include a second opening and access is provided by rotating the sealing member so that the two openings are aligned.

20 Claims, 21 Drawing Sheets

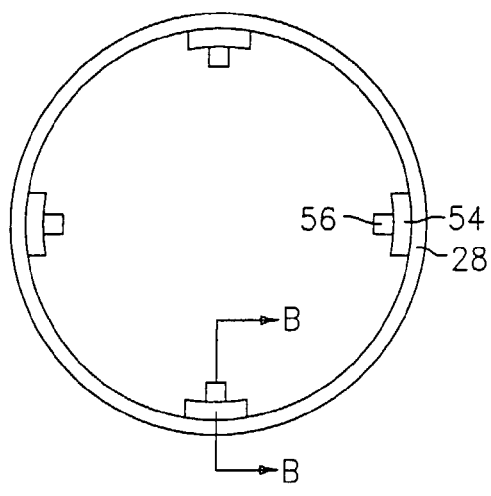
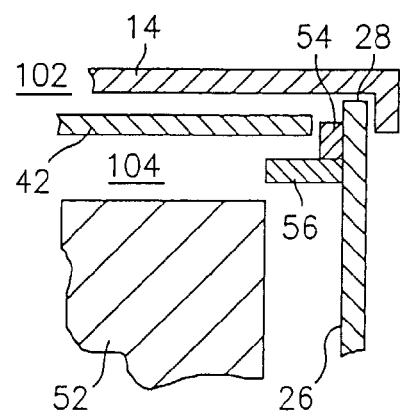
FIG. 3           FIG. 3A
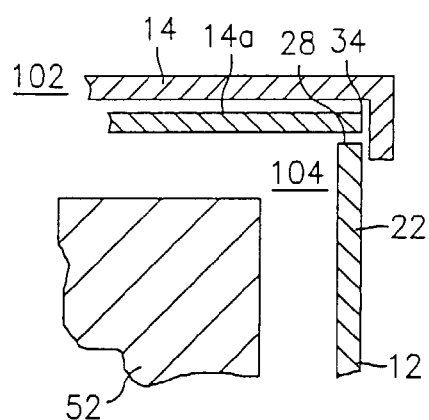
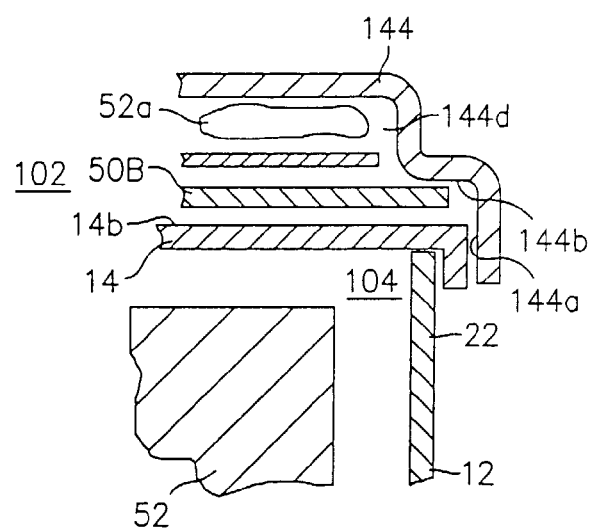
FIG. 3B          FIG. 3C

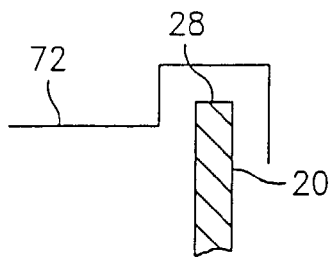
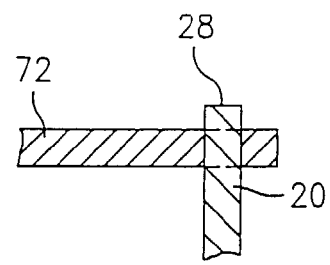
FIG. 6A        FIG. 6B
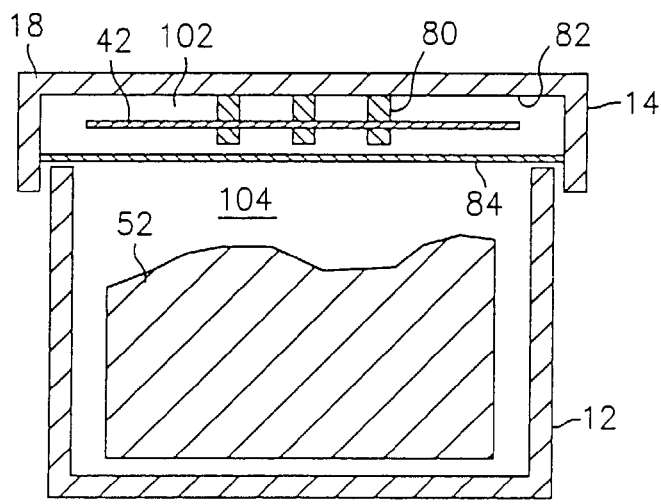
FIG. 7
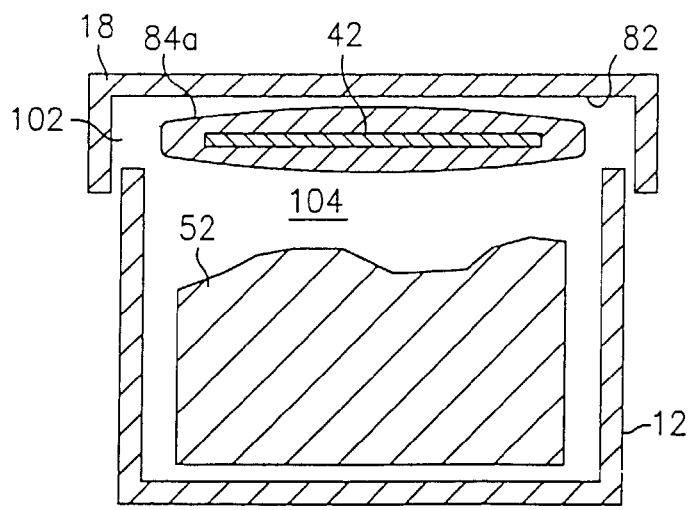
FIG. 7A

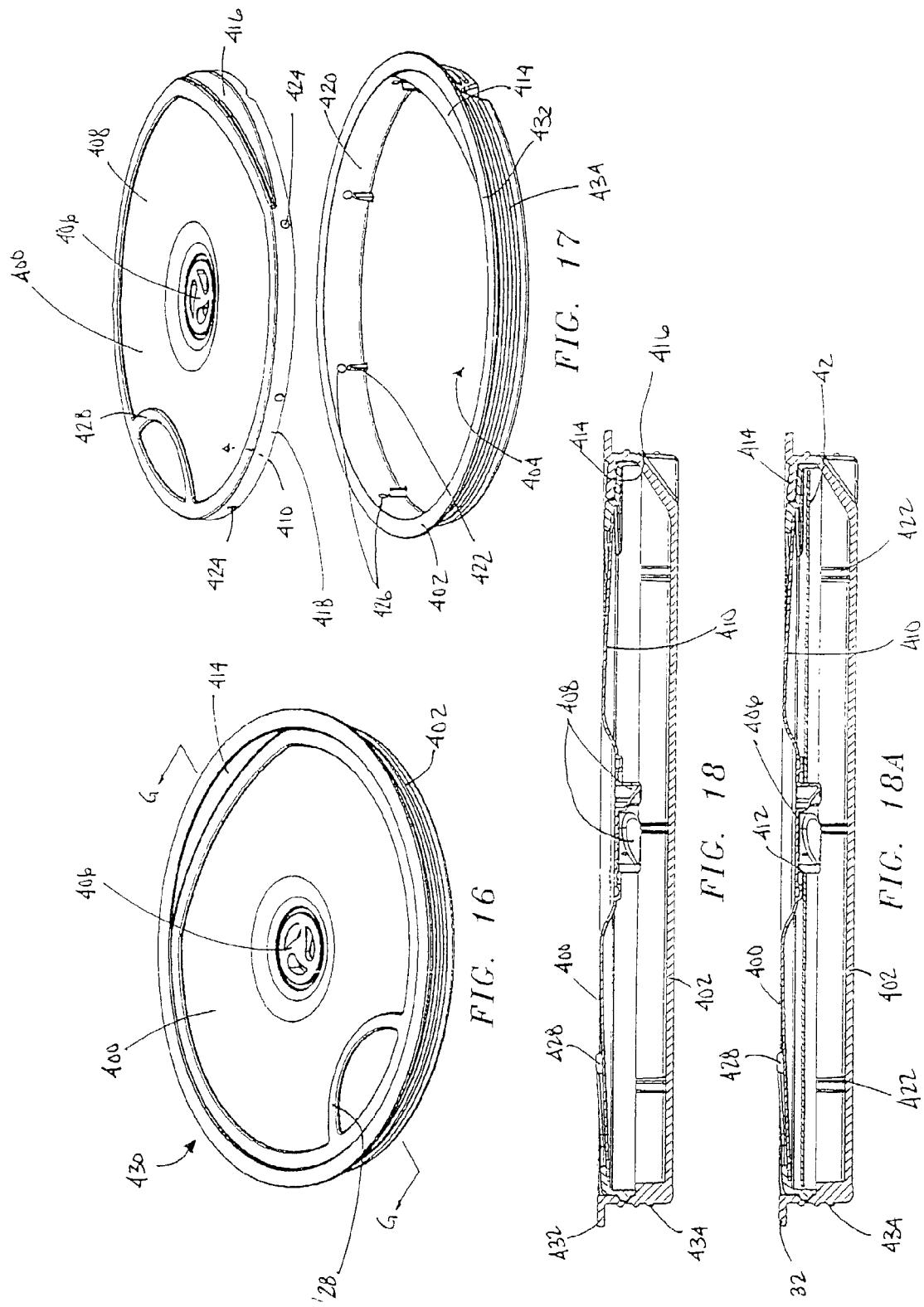

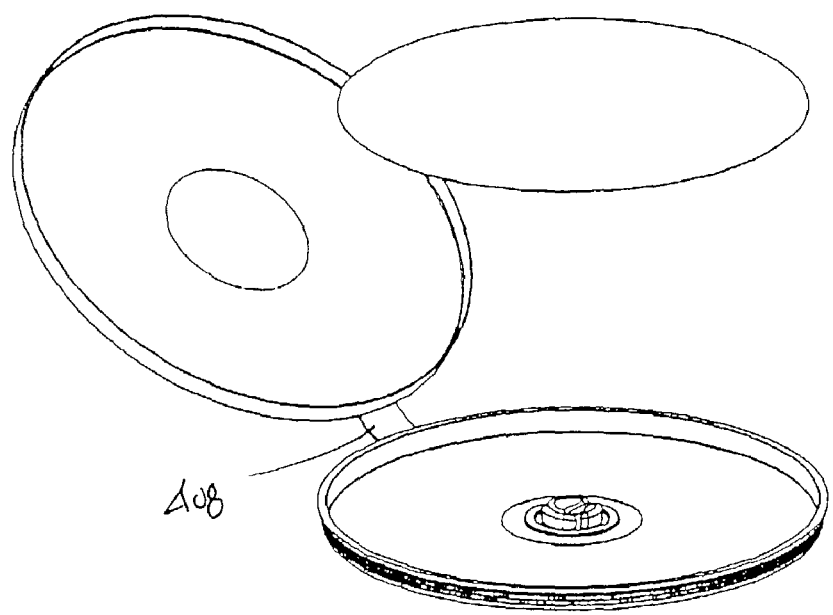
SCALE 0.500     FIG. 19D
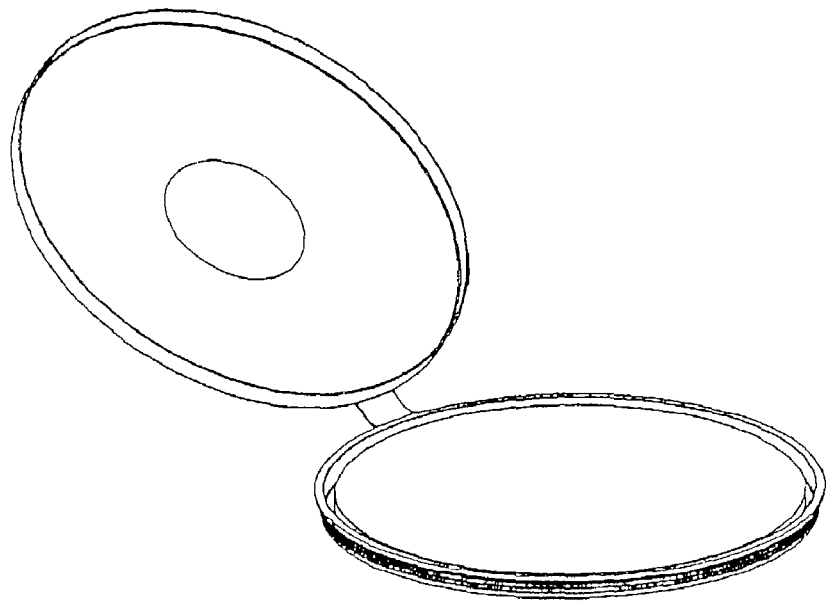
FIG. 19E
SCALE 0.500

Clam Shell System 2
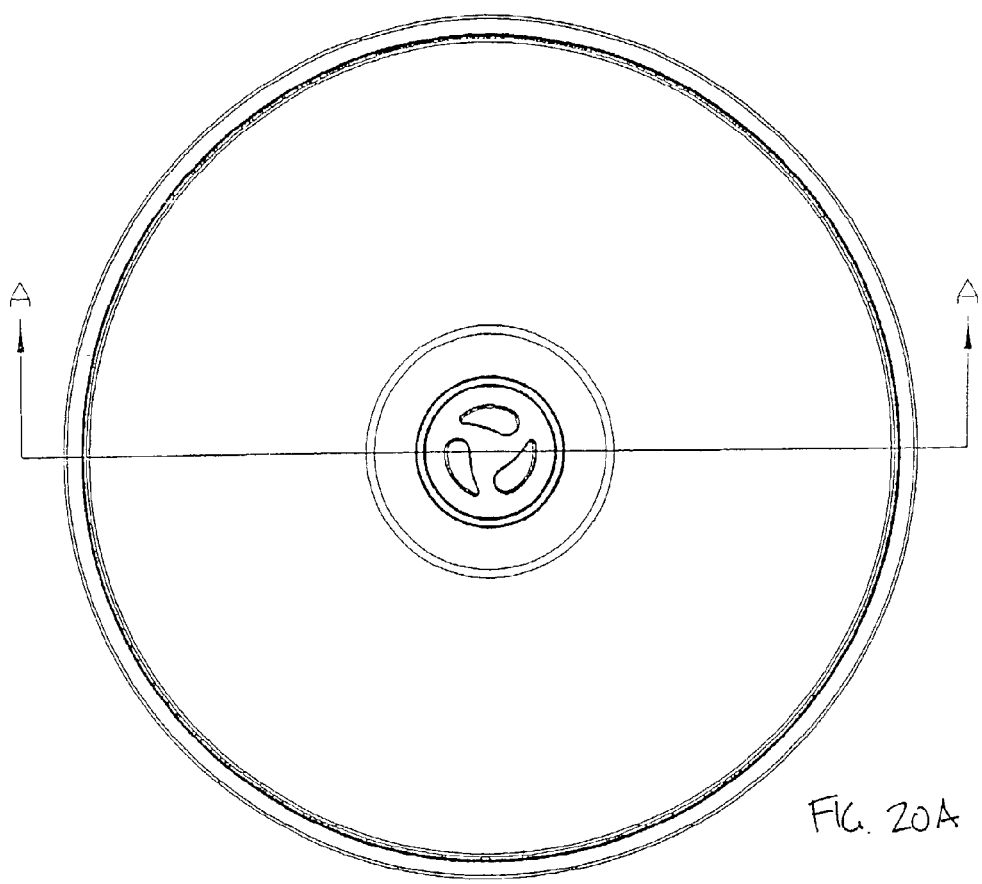
FIG. 20A
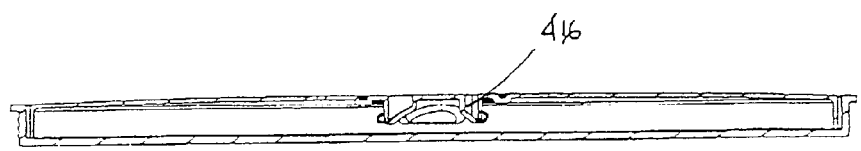
SECTION A-A    FIG. 20B
FIG. 20C

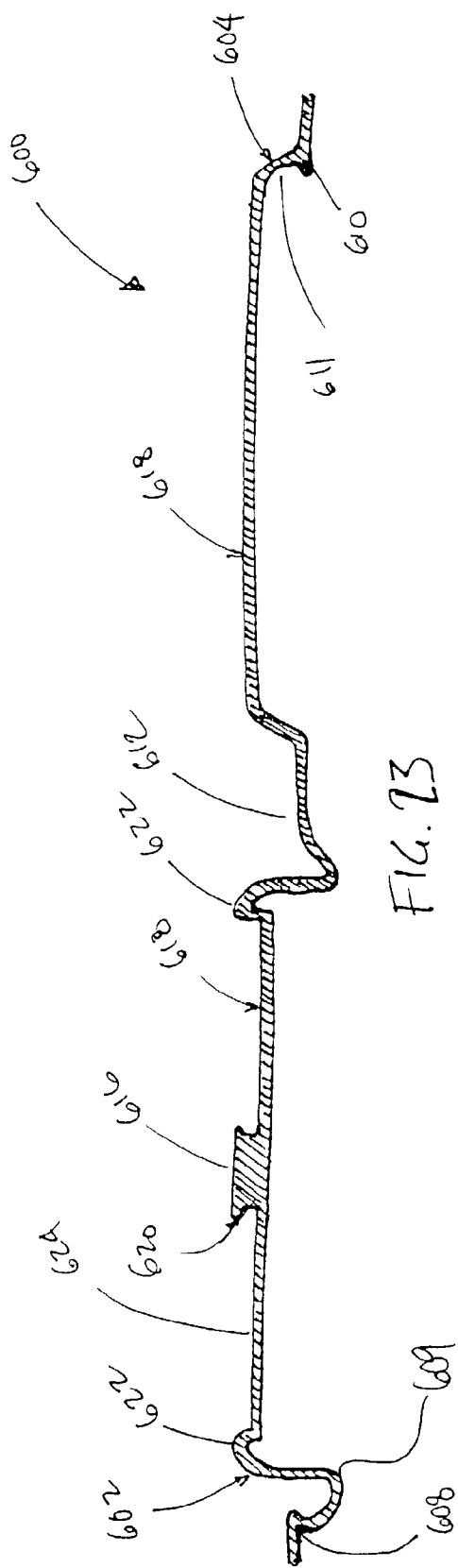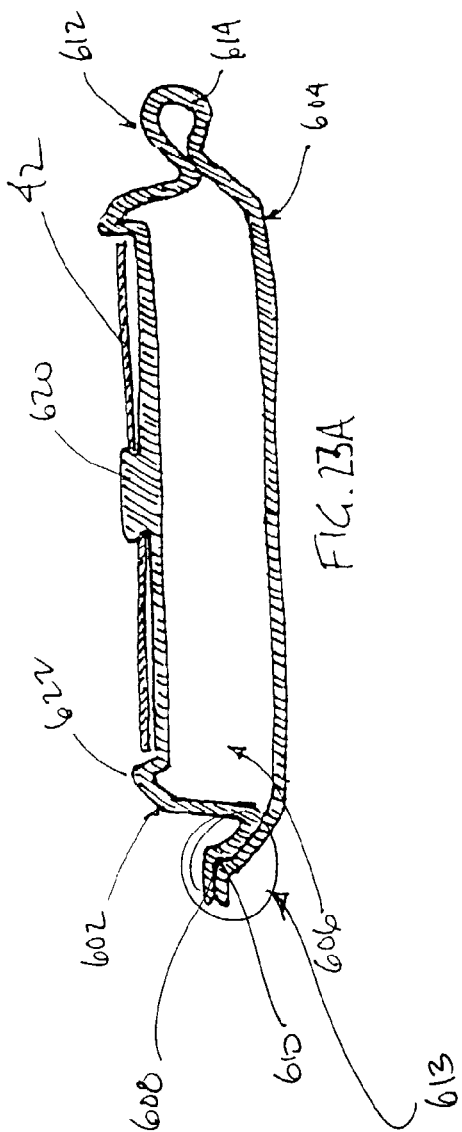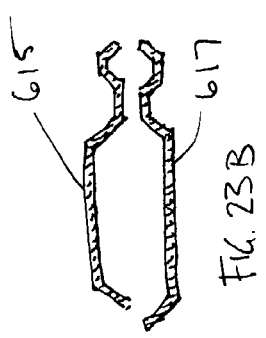

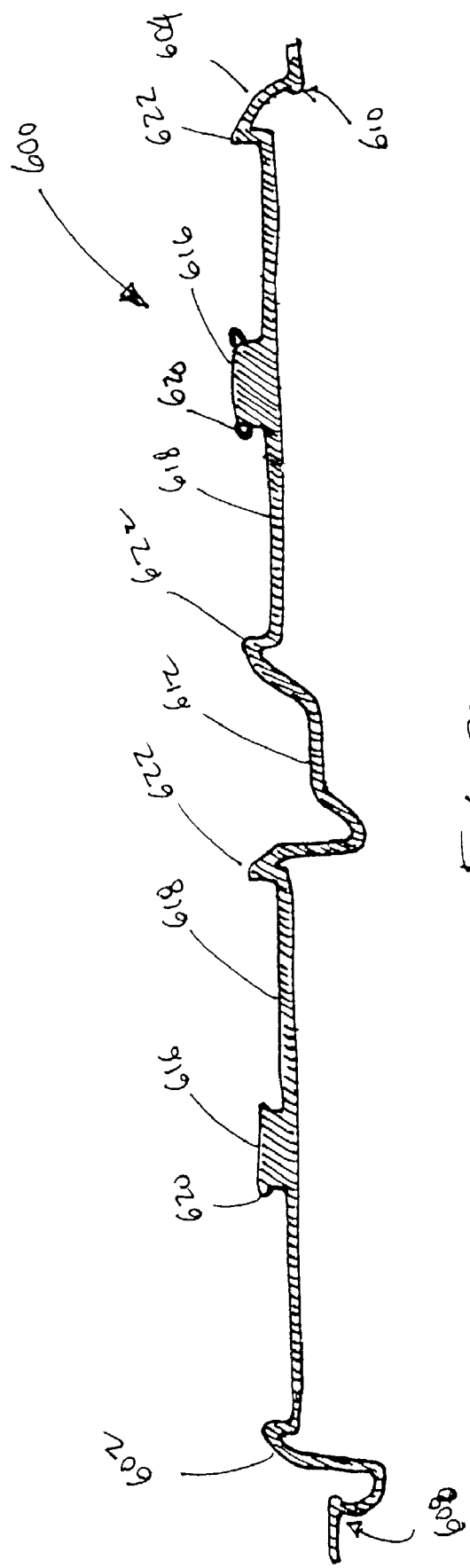

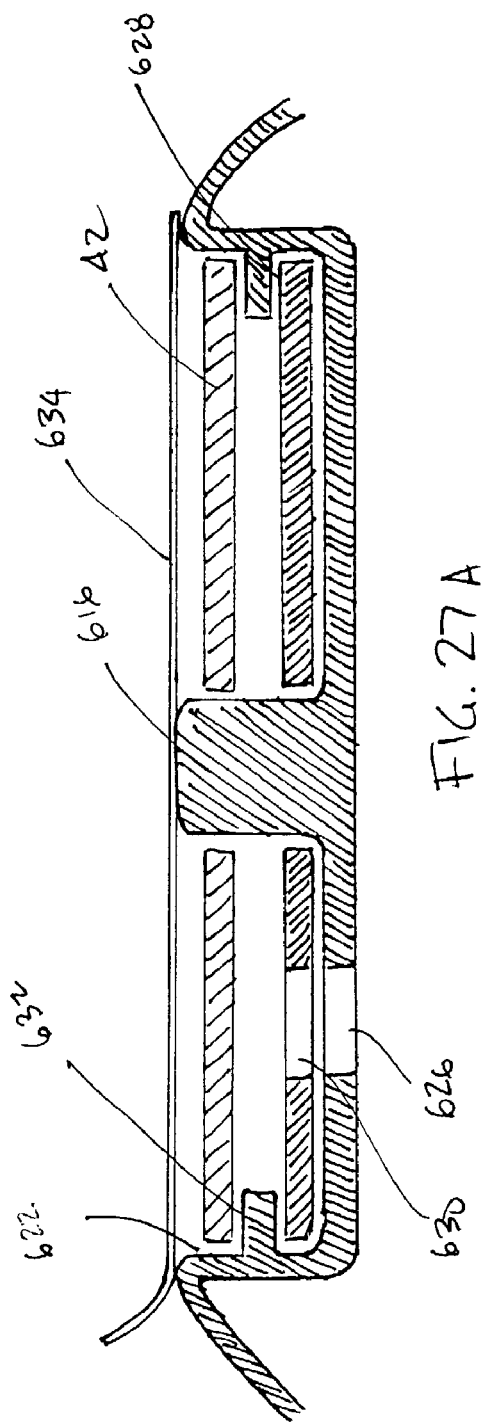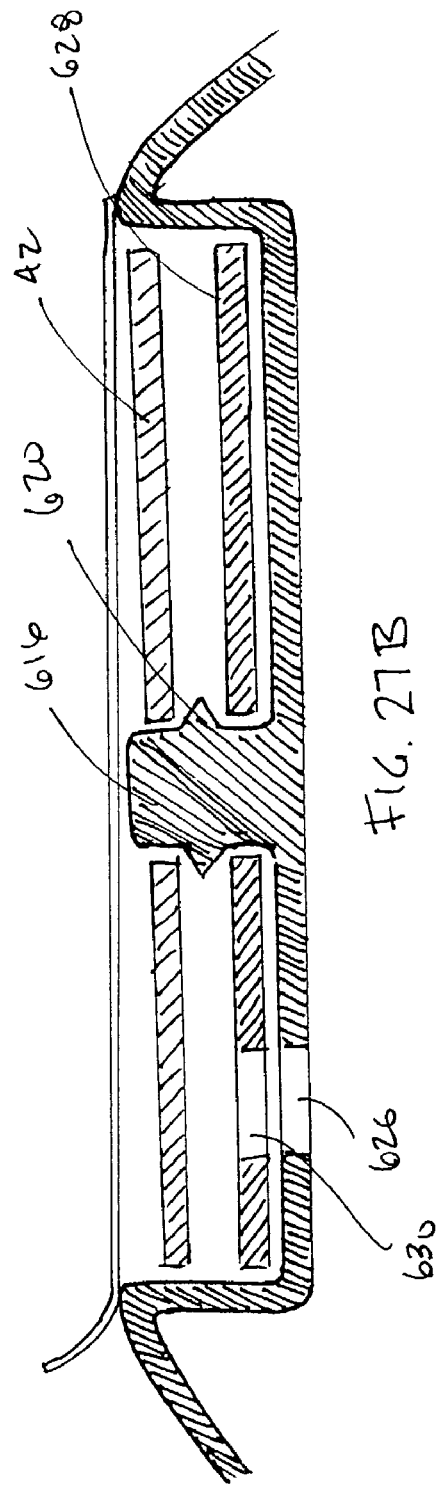

MEDALLION PACKAGING DEVICE FOR DISC-SHAPED ITEMS AND RELATED MATERIALS AND METHOD FOR PACKAGING SUCH DISCS AND MATERIAL

RELATED APPLICATIONS

This is a continuation-in-part of U.S. patent application Ser. No. 09/916,870 filed on Jul. 27, 2001 U.S. Pat. No. 6,561,345 in the name of Alexandra Gordon, Charles W. Grimes and William L. Plumb for "Clamshell Packaging Device for Disc-Shaped Items and Related Materials and Method for Packaging Such Disks and Materials," which, in turn, is a continuation in part of U.S. patent application Ser. No. 09/565,342 filed on May 5, 2000 U.S. Pat. No. 6,349,821 in the name of Alexandra Gordon and Charles W. Grimes for "Plug Packaging Device for Disc-Shaped Items and Related Materials and Method for Packaging Such Disks and Materials," which, in turn, is a continuation in part of U.S. patent application Ser. No. 09/161,064 filed on Sep. 25, 1998 in the name of Alexandra Gordon and Charles W. Grimes for "Packaging Device for Disc-Shaped Items and Related Materials and Method for Packaging Such Disks and Materials," which has since issued as U.S. Pat. No. 6,216,857.

BACKGROUND OF THE INVENTION

1. Field of the Invention

This invention relates, in general, to a device for packaging and displaying a circular or disc-shaped media and other materials and a method for packaging such disc-shaped media and other materials and, in particular, to containers and methods for initially packaging and thereafter repeatedly storing disc-shaped media together with or without other materials.

Still more particularly the present invention relates to a new and improved container for initially packaging and thereafter repeated storing of disc-shaped media and other materials in stacked relationship, including means for receiving and securely retaining the disc media and the other materials.

Still more particularly the present invention further relates to a new and improved system and method for initially packaging and thereafter repeated storing of media and other materials in stacked relationship, wherein in a preferred embodiment the media is releasably retained by a container such that the media is permitted to move rotationally while being limited in linear movement both perpendicularly and parallel to the plane of the media, and the other materials are placed inside the cavity defined by said container. The container includes two separate and complementary container elements, said elements being attached or joined by a flexible hinge.

2. Background of the Invention

Packaging and storage devices for media are generally known. Disc-shaped media, such as CD's, DVD's or CD-ROM's, encounter special problems in handling, packaging and storage due to their delicate, flat recorded surfaces. Such disc media is generally sold in plastic cases which are sometimes referred to as "jewel boxes." Such cases are generally rectangular and have a mounting hub for holding the disc media by its center aperture. Such cases are usually kept after purchase of the disc media and utilized for re-packaging of the disc media between usage. Such jewel boxes are impractical packaging containers for shipping because of their small dimensions and easy breakage, and they thus require substantial additional packaging material or placement in larger shipping containers.

Disc media is routinely sold with other materials (whether directly related to the content of the disc media, i.e., ancillary, or otherwise). At the present time, disc media in such "jewel boxes" is commonly packaged together with ancillary materials in larger rectangular shaped cardboard boxes for shipping, sale and packaging. The "jewel boxes" are necessary to reliably protect the disc media from contact with the ancillary materials in the larger cardboard boxes. Such plastic case/cardboard box combination package arrangements are not only expensive, they also do not lend themselves to easy and secure repeated re-storage of the disc media and ancillary materials. They are often damaged during initial opening and repeated re-storage. They are often unable after initial opening to securely re-store the disc media (in the jewel box) and the other materials together in the cardboard packaging in a manner to preclude contact with each other. They frequently become unsightly after initial opening and repeated re-storage. They are, themselves, difficult to handle and store.

Other types of packaging and storage devices are needed to organize, protect, ship, display at retail and store disc media sold and/or shipped in combination with ancillary materials.

A need also exists for devices which can effectively and efficiently organize, protect, ship, display at retail and store disc shaped media with other materials.

An opportunity exists that is not being commercially exploited at the present time to distribute disc-shaped recording media with materials that are either ancillary or wholly unrelated to the content of the disc media. This opportunity arises in connection with delivery of purchases to catalog, e-commerce, and other "shop-at-home" customers, as well as for the distribution of free-standing-insert type advertising, samples, business-to-business communications and other forms of direct marketing and retail sales. This opportunity is not being exploited due to the lack of an effective container design and method for efficiently organizing, protecting, shipping, displaying at retail and storing disc-shaped media packaged with other materials.

SUMMARY OF THE INVENTION

The primary object of the present invention is to provide a container in which and a method whereby disc-shaped media and ancillary materials can initially be packaged together in stacked relationship and, after removal and use, they can easily be re-stored in stacked relationship in a manner so as to avoid contact therebetween.

Another object of the present invention is to provide a container and a method of packaging that eliminates the need for a separate case (i.e., the need for a "jewel box") for the disc media.

Yet another object of the present invention is to provide a container and a method of packaging whereby during initial storage, shipping, retail presentation and re-packaging disc media is securely held against movement and protected.

Still another important object of the present invention is to provide a shipping container in which and a method of packaging whereby disc-shaped media and other materials can be packaged, presented, conveyed, distributed and stored.

But another important object of the present invention is to provide an aesthetically unique and compelling device and method for presenting at retail disc-shaped media and other materials which may or may not be related to the content of the media.

Another object of the present invention is to provide a container and a method of packaging including a container in a clam-shell configuration having two complementary compartments joined by an interlocking mechanism such as a common hinge forming, when in the closed position, a chamber, at least of one of said compartments including means on the external surface thereof to receive and retain a disc media and prevent movement of said disc media in the plane or perpendicular to the plane of the disc media, and further wherein said chamber can receive and retain materials other than said disc media.

Still another object of the present invention is to provide a container and a method of packaging whereby two disc media may be simultaneously received and retained on external surfaces of a container having a clam-shell like configuration, and further wherein materials other than the disc media may be stored within a chamber in the container.

Another object of the present invention is to provide a container and a method of packaging whereby a disc media may be received and retained on an external surface of a container having a clam-shell like configuration and materials other than the disc media may be stored within a chamber in the container, wherein access to said materials is provided by an opening in said container.

Still another object of the present invention is to provide a container and a method of packaging whereby access to a chamber in a container having a clam-shell like configuration is provided by an opening in said container, which opening is covered by a seal.

Another object of the present invention is to provide a container and a method of packaging whereby access to a chamber in a container having a clam-shell like configuration is provided by an opening in said container, which opening is covered by a seal, wherein said seal includes an opening corresponding to said opening in said container, and further wherein said seal may be rotated so as to alternatively align said openings to provide access into said chamber or close said opening in said container.

Yet another object of the present invention is to provide a container and a method of packaging whereby the first member has two complementary components, capable of being joined together by a complementary interlocking structure, and the outside configuration of one of the compartments is adapted for seating engagement with the second member.

Another object of the present invention is to provide a "safety" seal whereby the first member is secured to the second member until the end user receives the container and removes the seal to thereby allow the two members to be separated.

A further object of the present invention is to provide a container and method of packaging whereby the second member includes a removable seal to protect the other materials stored therein.

To accomplish these and other objects, the container of this invention in its preferred form is a packaging device for packaging at least one disc-shaped recording media and materials other than said disc-shaped media comprising a container consisting of a pair of complementary container elements attached to each other at the edges thereof by means of an interlocking mechanism as is commonly known in the art, such as an interlocking snap fit or a common hinge, such that the shape of said complementary container elements is in a mating top and bottom or "clam-shell" type configuration. The container has an open position in which the complementary container elements are separated, and a closed position in which the complementary container elements are engaged with each other and cooperate to form a cavity therebetween. The container elements include means for retaining the container in a closed position with the first container element being situated immediately adjacent to the second container element such that the chamber formed thereby is relatively insulated. Said means for retaining may be a snap or clasp, or may simply require that one of said container elements be slightly smaller in diameter than the other such that the smaller container element nests within the larger. The complementary container elements may be prevented from separating in the open position by means of the flexible hinge. The flexible hinge or interlocking mechanism may also serve to create a closed loop when said container is in the closed position, through which a rope or lanyard may be inserted to thereby create a convenient means for carrying the container about one's neck, wrist, waist or otherwise.

Disposed on at least one external surface of the container is means for supporting and protecting said recording media within said first chamber against lineal movement in either the plane of the recording media or perpendicular to the plane of the recording media, while simultaneously allowing the recording media to rotate about the axis perpendicular to the plane of the recording media. In alternative embodiments, means for supporting a second disc-shaped media is also provided, or alternatively, an opening may be provided on the external surface of the container on the side opposite that upon which the disc-shaped media is retained, said opening providing access into the chamber and the material stored therein. A sealing member may also be provided to cover said opening, which sealing member must be removed to provide access to the opening. Alternatively, the sealing member may include a second opening corresponding to the opening in the container, and access is provided through said openings by rotating the sealing member so that the two openings are aligned. Stops may also be provided so as to prevent the sealing member from rotating freely.

The above, as well as additional objects, features and advantages of the invention will become apparent in the following detailed description.

BRIEF DESCRIPTION OF THE DRAWINGS

The novel features believed characteristic of the invention are set forth in the appended claims. The invention itself, however, as well as the preferred mode of use, further objects and advantages thereof, will best be understood by reference to the following detailed description of illustrative embodiments when read in conjunction with the accompanying drawings, wherein:

FIG. 3 is a top plan view of the novel disc packaging device of the present invention illustrating the alternative use of abutments and protrusions affixed to the inside wall of the container;

FIG. 3A is a cut-away, cross-sectional side view of a portion of the device shown in FIG. 3, along line B—B, with a disc media and other materials inserted and the lid affixed;

FIG. 3B is a cut-away, cross-sectional side view of an alternative embodiment of the novel disc packaging device of the present invention illustrating the alternative use of the upstanding rim of the base and the inside wall of the cover in place of the abutments and protrusions of FIG. 3;

FIG. 3C is a cut-away, cross-sectional side view of an alternative embodiment of the novel disc packaging device of the present invention illustrating the alternative use of the outer surface of the cover and the inner surface of a supplementary cover in place of the abutments and protrusions of FIG. 3;

FIGS. 6A and 6B are cross-sectional views of alternate embodiments of the packaging device of the present invention depicting two different methods of mounting the disc media support member to the device outer wall;

FIG. 7 is a cut-away, cross-sectional side view of an alternative embodiment of the present invention with disc media and other materials inserted, the protective element inserted and the lid closed, in which the first chamber in which the disc media is stored is in the cover;

FIG. 7A is a cut-away, cross-sectional side view of an alternative embodiment of the device shown in FIG. 7, wherein the disc media is inserted into a protective envelope that is affixed to the inner surface of the cover;

FIG. 16 is a perspective view of another embodiment of the novel disc packaging device of the present invention in which the disc media is retained in a lid, which lid is engaged and retained within a container by means of an arcuate lip and tab or snap means, and the entire container and lid structure is then inserted into the opening of another container (not shown) containing other materials;

FIG. 17 is an exploded perspective view of the embodiment of FIG. 16;

FIG. 18 is a cut-away, cross-sectional view of the embodiment of FIG. 16 along line G—G;

FIG. 18A is a cut-away, cross-sectional view of the embodiment of FIG. 16 along line G—G showing the disc media retained therein.

FIG. 19D is a perspective view of the embodiment of FIG. 19A showing an optional seal being inserted;

FIG. 19E is a perspective view of the embodiment of FIG. 19D showing the optional seal completely inserted;

FIG. 20A is a top elevational view of another embodiment of the novel disc packaging device of the present invention in which the disc media is retained in the bottom chamber of a clam-shell first member, which first member is engaged and retained within the container and serves as a cover or seal thereto;

FIG. 20B is a cross-sectional view of the embodiment of FIG. 20A;

FIG. 20C is a side elevational view of the embodiment of FIG. 20A;

FIG. 23 is a cross-sectional view of yet another alternate embodiment of the novel disc packaging device of the present invention in which the disc media is stored on an external surface of a one piece clam-shell like container having a chamber therein for storing materials other than said disc media;

FIG. 23A is a cross-sectional view of the alternative embodiment of FIG. 23, showing the clam-shell like container in a closed position;

FIG. 23B is a cross-sectional view of an alternate embodiment of FIG. 23, showing two separate container elements having extensions that mate together to form a loop;

FIG. 24 is a cross-sectional view of an alternative embodiment of FIG. 23 including means for storing a second disc media on the side opposite the first disc media;

FIG. 27A is a cross-sectional view of an alternative embodiment of the packaging device of FIG. 25 having a seal; and FIG. 27B is a cross-sectional view of another alternative embodiment of the packaging device of FIG. 25 having a seal and protrusions on the hub.

DETAILED DESCRIPTION OF THE INVENTION

Figure 1:
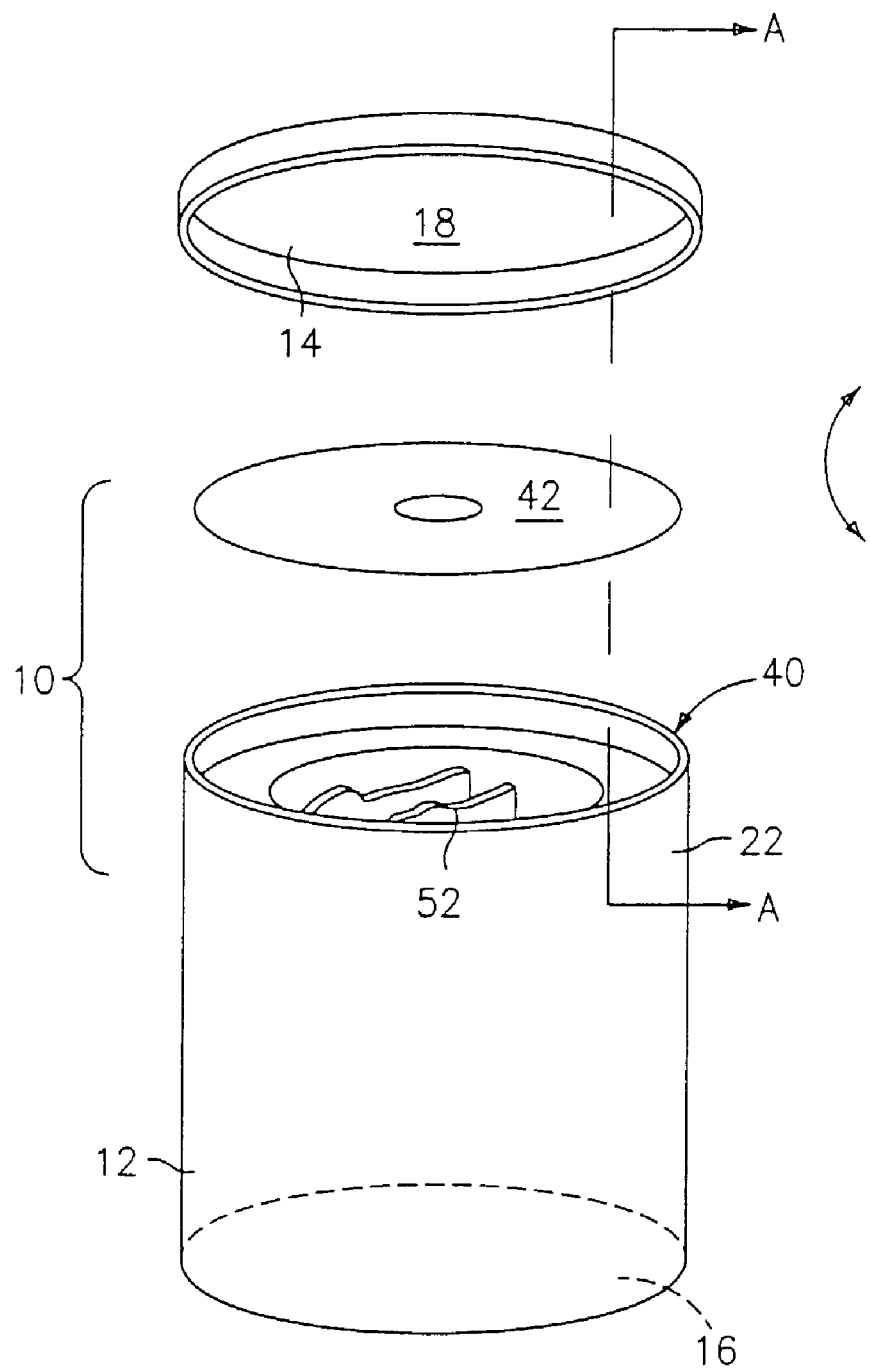
FIG. 1 is an exploded perspective view of the novel disc packaging device of the present invention with the lid and disk media removed, illustrating the use of a one-piece annular collar member with an annular ring and lip.

With reference now to the figures and in particular with reference to FIG. 1, there is shown a front view of the disc packaging device 10 of the present invention. As illustrated, disc packaging device 10 includes a lower base component or container 12 and an upper cover component or lid 14. Lower base component 12 and upper cover component 14 are utilized to form a generally cylindrical packaging device of dimension slightly larger than the disc shaped recording media to be stored. End plates 16 and 18 cooperate with lower base component 12 and upper cover component 14 to fully enclose the cylindrical packaging space defined thereby.

Figure 2:
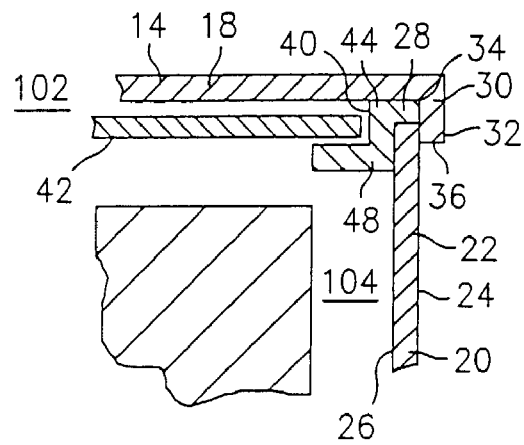
FIG. 2 is a cut-away, cross-sectional side view of a portion of the novel disc packaging device of FIG. 1 when the lid is on the container, along line AA illustrating the resultant first and second chambers thereof.

The lower base component 12 of the embodiment of this invention shown in FIGS. 1 and 2 includes a side wall 20. The side wall can be constructed from either cardboard (i.e., natural fiber material) or plastic (i.e., man-made synthetic material) or other material suitably rigid for the base component to retain its shape, including metal, e.g., as in a vacuum sealed, canned product.

The base component 12 can be designed to threadably receive the bottom plate 16 which is of conventional design, made of stiff cardboard, plastic, metal or some similarly rigid material and used as a cover-all screw cap on a very wide variety of containers. Alternatively the bottom plate 16 can nest inside the side wall 20 where it is held by friction, stapling, gluing or some other means. The side wall 20 has an upper section 22 and the upper section 22 can be threaded to accommodate the upper cover component 14 although in the embodiment shown in FIGS. 1 and 2 the cover is made of plastic and snaps on in a conventional manner.

As best seen in FIG. 2, the upper section 22 is defined by an outer wall 24, an inner wall 26 and a rim 28. The cover component 14 has a side wall 30 defined by an outer wall 32, an inner wall 34 and a rim 36. The diameter of the inner wall 34 of the cover component is slightly greater than the diameter of the outer wall 24 of the base component. In the embodiment shown in FIGS. 1 and 2, there is an inner structure 40 which provides circumferential support for a disc shaped media 42 stored within the packaging device 10. The structure 40 comprises an annular collar 44 having an annular ring 46 and an annular lip 48. The inner structure 40 nests within the lower base component 12. The annular collar 44 has an outer diameter greater than the diameter of the inner wall 26 of the base component such that the annular collar extends beyond the inner wall 26 and sits on top of the base rim 28. The annular ring 46 has an outer diameter less than the diameter of the inner wall 26, such that the annular ring nests inside the inner wall 26. The annular lip 48 has an inner diameter less than the outer diameter of the disc shaped media 42. Thus, the disc shaped media will rest on the annular lip, inside the annular ring. In this way, movement of the disc shaped media in the plane of the disc shaped media is precluded by the annular abutment 46. Movement of the disc shaped media perpendicular to its plane is prevented in one direction by the annular lip 48. When the cover component 14 is affixed to the base component 12, the cover plate 18 acts to preclude movement of the disc shaped media in the opposite perpendicular direction to the plane of the disc shaped media.

Figure 2A:
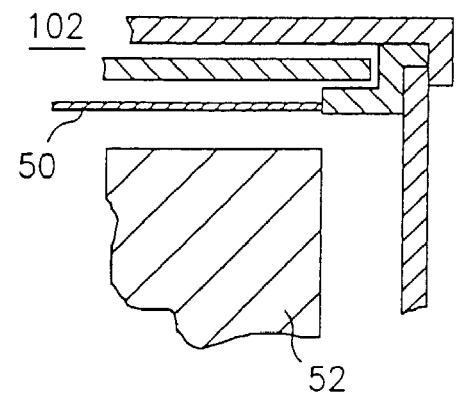
FIG. 2A is an alternative embodiment of the device shown in FIG. 2, wherein a protective element is inserted between the first and second chambers.

In the embodiment disclosed in FIG. 2A, a protective member 50 is attached to the annular lip 48. The protective member can be made of plastic film or any other conventional material to provide a barrier between the disc shaped media and other materials 52 which can be stored in the base component 12 of the packaging device 10. The protective member can be permanently affixed to the annular lip or it can be affixed at the time of assembly and shipment and removed by the consumer after purchase, i.e., at a time when further "rough handling" that would cause interaction between the disc shaped media and the other materials is less likely to occur.

Figure 2B:
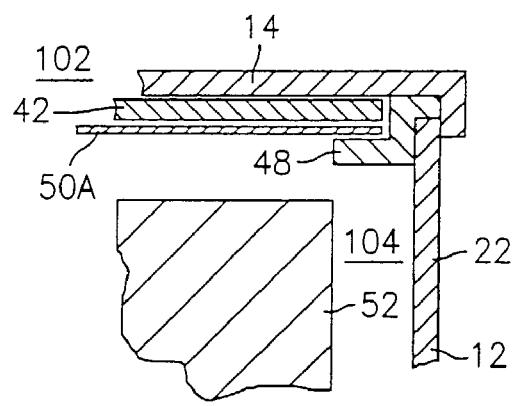
FIG. 2B is an alternative embodiment of the device shown in FIG. 2A, showing an alternative method of insertion of the protective element between the first and second chambers.

In an alternative embodiment disclosed in FIG. 2B, the protective element is removable and sized to seat on the annular lip 48 between the annular lip 48 and the disc shaped media. The protective element is round like the disc shaped media and has a central opening into which one's finger can be inserted to engage, lift and remove the protective element and subsequently engage, lift and replace the protective element.

Figure 2C:
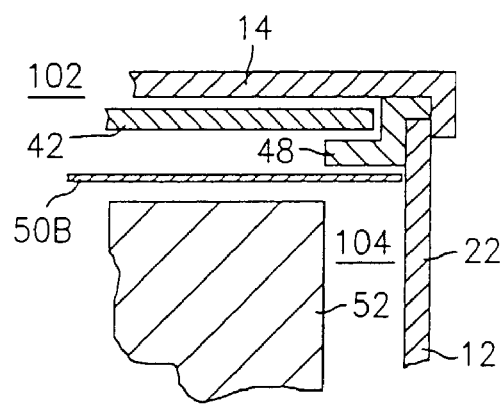
FIG. 2C is a further alternative embodiment of the device shown in FIG. 2A, showing, a further alternative method of insertion of the protective element between the first and second chambers.

In an alternative embodiment disclosed in FIG. 2C, the protective element 50B is flexible and is removably inserted within the lower base component beneath the annular lip 48 and on top of the other materials 52 placed therein. The protective element is sized to correspond to the interior wall 26 and has a central opening into which one's finger can be inserted to engage, lift and remove the protective element and subsequently engage, lift and replace the protective element. Alternatively, the protective element can be provided with a lift tab or some other conventional means whereby it can be grabbed and removed.

In the alternative embodiment shown in FIGS. 3 and 3A, the inner structure 40 is modified. The annular collar 44 with annular ring 46 and annular lip 48 is replaced. by discrete abutments 54 and discrete protrusions 56. Collectively, the abutments 54 and protrusions 56 are positioned within the lower base component 12 around the circumference of the inner wall 26 spaced below the rim 28, affixed to the inner wall 26, so as to perform the same function as the annular ring 46 and annular lip 48. Specifically, the abutments 54 preclude movement of the disc shaped media in the plane of the disc shaped media i.e., performing the same function as the annular ring 46. Similarly, the protrusions 56 are positioned about the inner wall 26 and collectively preclude movement of the disc shaped media in a direction perpendicular to plane of the disc shaped media i.e., performing the same function as the annular lip 48.

FIG. 3B shows a further alternative embodiment wherein the disc shaped media is seated on the rim 28 and movement of the disc shaped media perpendicular to its plane is prevented in one direction by the rim 28. When the cover 14 is affixed to the base component 12, movement of the disc shaped media in the plane of the disc shaped media is precluded by the inner wall 34 of the cover 14 and inner surface 14a of the cover 14 acts to preclude movement of the disc shaped media in the second, opposite perpendicular direction to the plane of the disc shaped media.

FIG. 3C shows a further alternative embodiment wherein the disc shaped media is seated on the outside surface 14b of the cover 14 and movement of the disc shaped media perpendicular to its plane is prevented in one direction by a supplementary cover 144 that snaps onto the cover 14. When the supplementary cover 144 is affixed to the cover 14, movement of the disc shaped media in the plane of the disc shaped media is precluded by the inner wall 144a of the supplementary cover 144 and the inner wall 144b of the supplementary cover 144 acts to preclude movement of the disc shaped media in the second, opposite perpendicular direction to the plane of the disc shaped media. The supplementary cover 144 can include a chamber 144d and a protective element 50b can be inserted to prevent contact between the disc shaped media and whatever materials 52a are placed in the chamber 144d.

Figure 4:
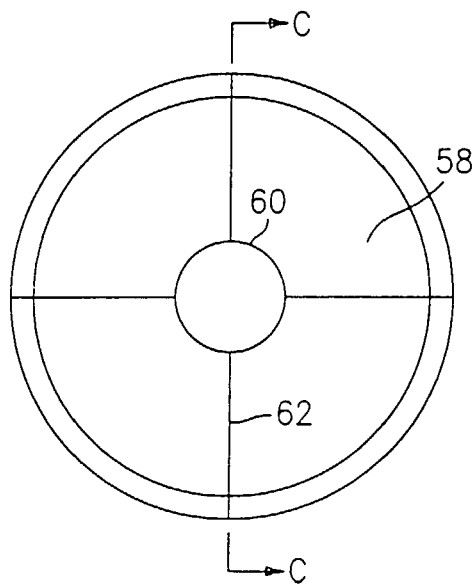
FIG. 4 is a top plan view of the novel disc packaging device of the present invention illustrating the alternative use of a center annular post support for the disc media suspended from spokes.
Figure 4A:
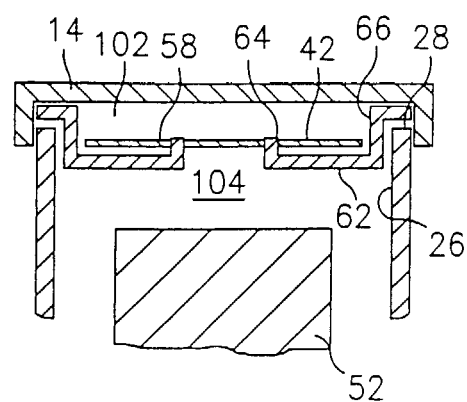
FIG. 4A is a cut-away, cross-sectional side view of the device shown in FIG, 4, along line C—C, with a disc media and other materials inserted and the lid affixed.

In the alternative embodiment seen in FIGS. 4 and 4A, the inner support structure 40 is replaced with an inner support structure 58 that provides center support for the disc shaped media as opposed to the circumferential support provided by inner structure 40. In the embodiment shown in FIGS. 4 and 4A, the alternative inner structure 58 includes an annular ring 60 and spokes 62 extending therefrom. As seen in FIG. 4A, the annular ring 60 has a raised portion 64 on which the disc media 42 sits, The spokes 62 each have a finger portion 66 which extends upwardly and outwardly such that when the structure 58 is inserted into the base component 12, the fingers 56 frictionally engage the inner wall 26 and sit on the upper rim 28. The structure 58 can include webbing between the fencers 56 (ala the webbing in a duck's foot) comprised of a thin material to provide protection for the disc shaped media 42 from the other materials 52. Inside the annular ring 60 would be left open to allow the consumer, after removing, the cover 14, to insert their finger into the annular ring and to thereby remove both the disc shaped media 42 and the structure 58.

Figure 5:
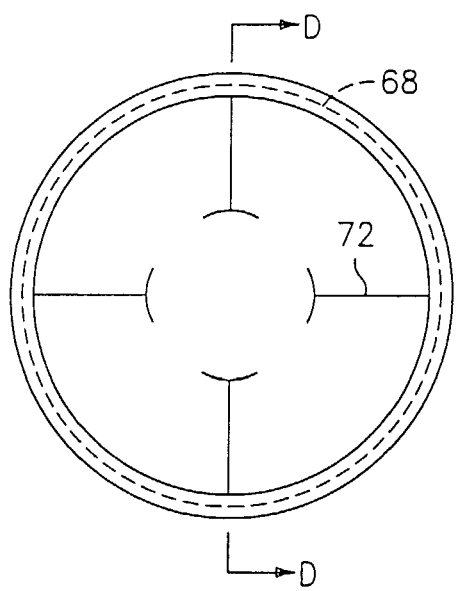
FIG. 5 is a top plan view of the novel disc packaging device of the present invention illustrating fingers that extend from a frame carried by the side wall of the container and that provide center support for the disc media.
Figure 5A:
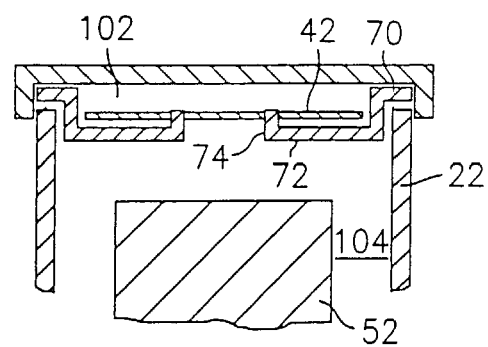
FIG. 5A is a cut-away, cross-sectional side view of the device shown in FIG. 5, alone, line D—D, with a disc media and other materials inserted and the lid affixed.

FIGS. 5 and 5A show a further alternative inner structure 68 comprising an annular collar 70 from which fingers 72 extend inwardly. At the ends of the fingers 72 are upstanding projections 74. The annular collar 70 nests inside the inner wall 26 and sits on the rim 28 in the same manner as the inner structure 40 in the embodiment shown in FIGS. 1 and 2. The upstanding projections 74 cooperate to provide a center support structure for the disc shaped media.

As seen in FIGS. 6A and 6B, the fingers 72 in the embodiment shown in FIGS. 5 and 5A do not necessarily need to be suspended from an annular collar. Alternatively, the could be clipped to the side wall 20 as seen in FIG. 6A or they could be screwed into the side wall 20 as shown in FIG. 6B.

In an alternative embodiment shown in FIG. 7, a center support structure is provided for the disc shaped media in the upper cover component 14. Specifically, projections 80 extend from the inside wall 82 of the end plate 18. These projections 80 cooperate to provide secure support for the disc shaped media in the cover component 14. A protective element 84 can be provided which is either removably nested within the cover as shown or which can be inserted at the time of manufacture and removed and discarded by the consumer after purchase. The cover 14 can engage the base component 12 in any variety Of conventional ways, e.g., snap on, telescope on, screw on, etc.

In a further alternative embodiment shown in FIG. 7A, the disc shaped media is encased within an envelope 84a made of plastic or some other suitable material and which is affixed to the inside wall 82 of the end plate 18. The envelope is either removably or permanently affixed, e.g., by gluing, with double-sided tape, or by other conventional means. The envelope can itself constitute a re-useable packaging container for the disc shaped media that either remains affixed to the plate 18 or can be removed from the plate 18, e.g., so that the cover 14 can be discarded. Or the disc shaped media can be packaged within a packaging sleeve (not shown) ail of which can then be inserted into the envelope and then removed from the envelope once the envelope is opened.

Figure 8:
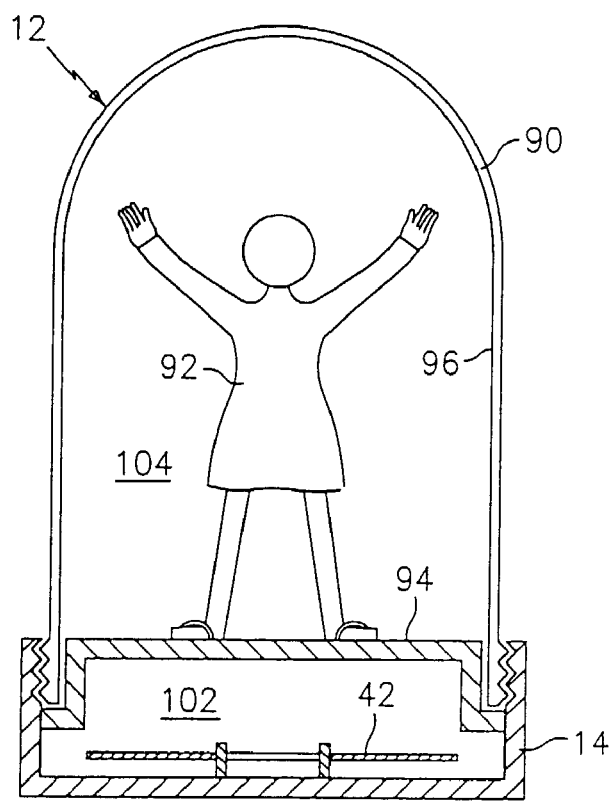
FIGS. 8 and 8A are side perspective, partially cut-away, cross-sectional views of alternative embodiments of the present invention, illustrating the use of the "lid" of the embodiment shown in FIG. 7 as the base, thereby allowing the portion of the invention defining the second chamber to be of an irregular shape (FIG. 8) or to have deformable construction (FIG. 8A)
Figure 8A:
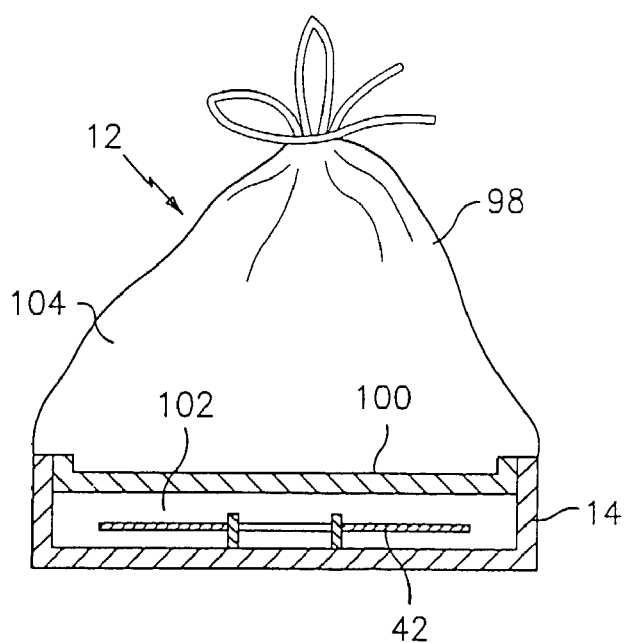

FIGS. 8 and 8A show further alternative embodiments of the present invention. In FIG. 8, the fact that the disc shaped media is stored within the cover component 14 allows for an alternative construction of the container 12. In this alternative embodiment, the cover 14 serves as the "base". The alternative base 90, in which the other materials, in this case, a doll 92, are stored, has an end wall structure 94 which frictionally encases the inner wall 96 and seals the chamber in the base 90. Alternatively, wall 94 can be provided with threads so that it will threadably engage corresponding threads on the inside wall 96. The cover 14 and base 90 can be attached in the same manner as heretofore been discussed in connection with other embodiments.

In the embodiment showing in FIG. 8A, the cover 14 once again carries the disc shaped media 42 and thereby allows the base 12 to be of a deformable construction 98. The deformable member 98 has a rigid internal support structure 100 which is designed to frictionally or threadably engage the cover 14.

Figure 9:
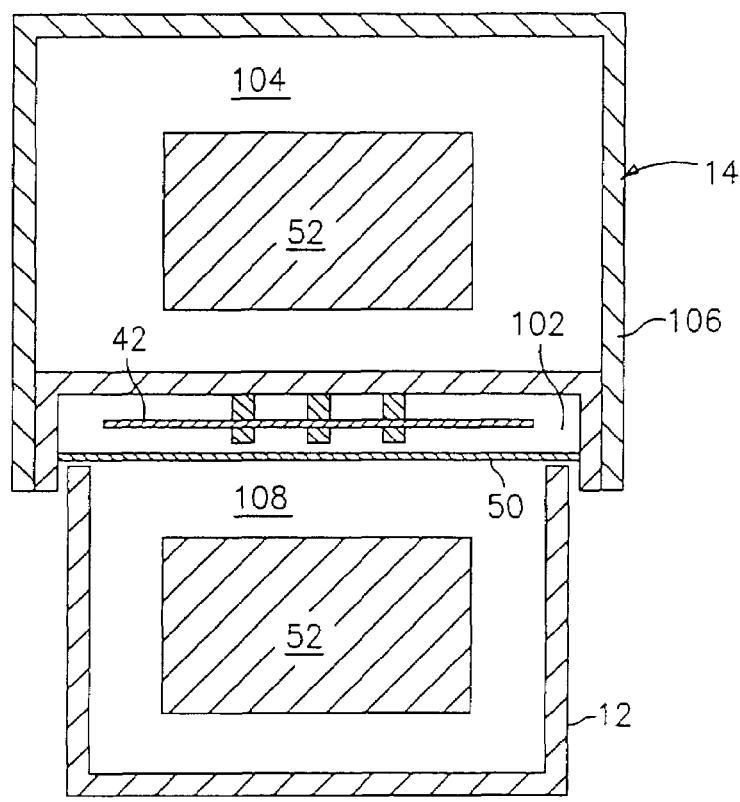
FIG. 9 is a cut-away, cross-sectional side view of an alternative embodiment of the present invention in which the disk media is located in the lid and the lid and the container include second and third chambers, respectively, for storing other material.
Figure 10:
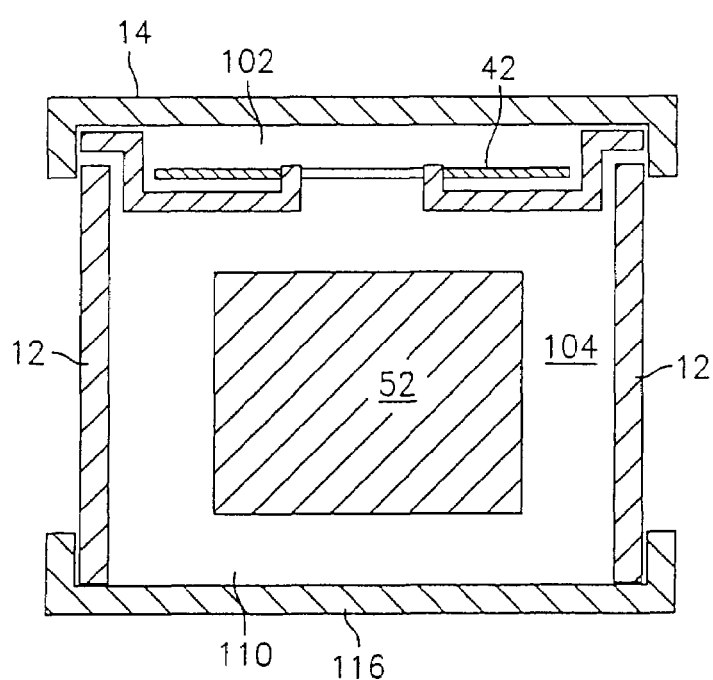
FIG. 10 is a cut-away, cross-sectional view of another embodiment of the present invention in which the second chamber in the container for storing other materials includes a second opening separate and distinct from the lid and a removable cover such that access to the second chamber can be attained without removing the lid.

In the alternate embodiment shown In FIG. 9, the disc shaped media is stored in a first chamber 102 in the lid 14 defined by an annular support 40 similar in construction to the embodiment of FIG. 7, except that the lid includes a second chamber 104 defined by an outer wall 106 for other materials and the base 12 includes a third chamber 108. In the alternate embodiment shown in FIG. 10, which is similar in construction to the embodiment of FIG. 4, there is provided an additional opening 110 in the container 22 and a cover 116 for closing the opening 110. The cover 116 can be removed to gain access to the chamber 104 without removing the cover 14.

Figure 11:
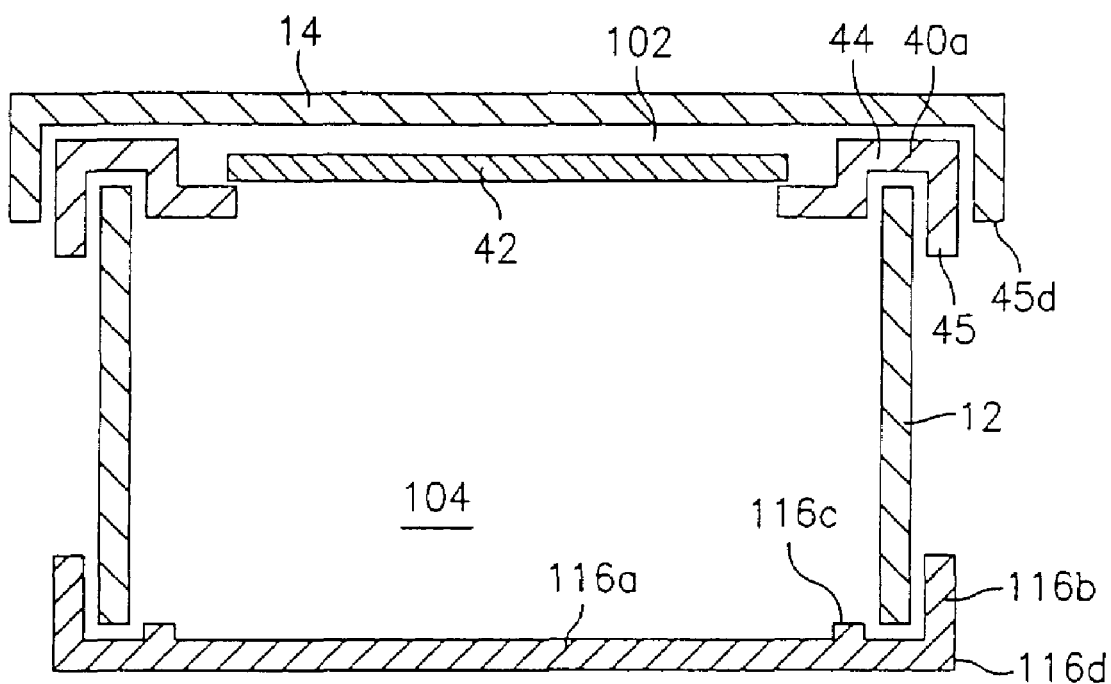
FIGS. 11 and 11A are cut-away, cross-sectional side views of another embodiment of the device shown in FIG. 10 in which the method of mounting shown in FIG. 6A is utilized and wherein the removable cover for the second chamber can be mated with the removable cover for the first chamber to form a mini-packaging device shown in FIG. 11A.
Figure 11A:
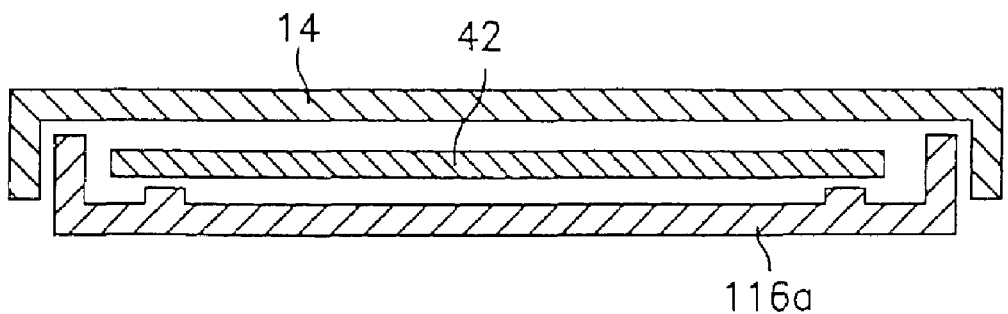

In the alternative embodiment shown in FIGS. 11 and 11A, an inner structure 40a is provided that is a slightly modified version of the inner structure 40 shown in FIG. 2, in that it includes an annular wall 45 that extends around the entire circumference of the annular collar 44 and engages the outer surface of the wall of the base 12, and the cover 14 is configured to engage not the base 12, but rather, the annular wall 45. An additional opening 110 is provided as in the embodiment of FIG. 10, and a cover 116a is provided that is a slightly modified version of the cover 116 of FIG. 10, in that it includes not only an outer annular wall 116b for engaging the outer surface of the wall of the base 12, but also an inner annular wall 116c for engaging the inner surface of the wall of the base 12. The circumferential dimension of the outer surface 116d of the wall 116b of the cover 116a is identical to the circumferential dimension of the outer surface 45d of the wall 45, such that the covers 14 and 116a can be removed and the cover 14 which matingly engaged the wall 45 will matingly engage the outer wall 116b of the cover 116a, as shown in FIG. 11A. In this way, as also shown in FIG. 11A, the covers 14 and 116a can be used together as a mini-packaging device for the disc shaped media 42. In the embodiment shown, the inner wall 116c helps to securely retain the disc shaped media against movement. However, it is understood that the benefits of the invention could be achieved without such inner wall, or utilizing one of the other retaining methods disclosed herein.

Figure 12:
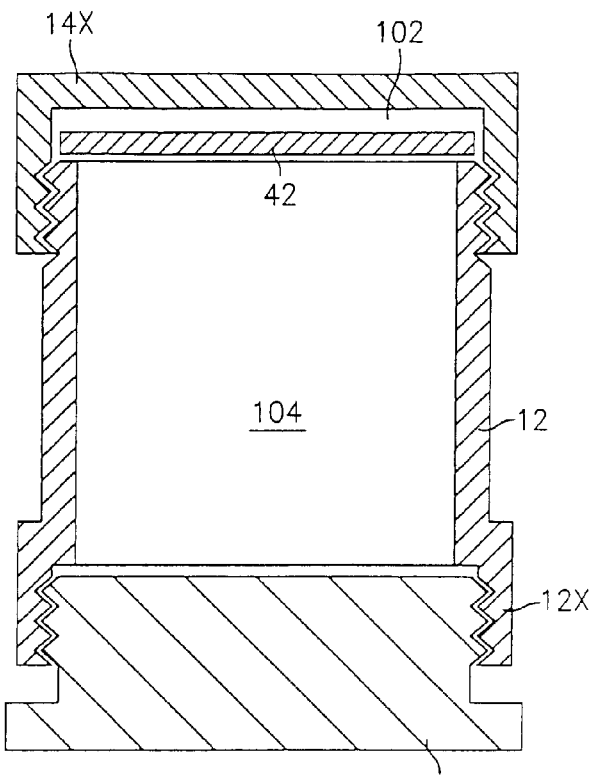
FIG. 12 is a cut-away, cross-sectional side view of an alternative embodiment of the device shown in FIGS. 11 and 11A in which the method shown in FIG. 3B for retaining the disc media is utilized and in which the two covers threadably engage the base and, when removed, can be threaded together to create a mini-packaging unit.

In the alternative embodiment shown in FIG. 12, the disc shaped media seats on the rim 28 as in the embodiment shown in FIG. 3B, but the cover 14x does not snap onto the base 12, but rather, threadably engages it. Furthermore, the bottom 12x of the base 12 is flared outwardly and contains internal threads that are of the same dimension as the internal threads of the cover 14x. The cover 116x includes mating external threads such that the cover 116x can be threaded into the flared bottom 12x of base 12. In this way, the covers 14x and 116x can be removed from the base 12 and threadably engaged to form a mini-packaging unit for the disc shaped media.

Figure 12A:
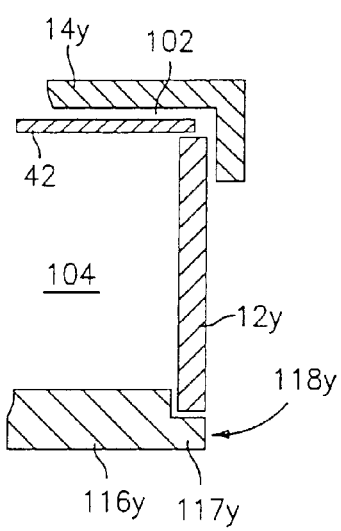
FIGS. 12A and 12B are cut-away, cross-sectional side views of alternative embodiments of the device shown in FIG. 12, wherein the two covers slidably engage after removal (FIG. 12A) or threadably engage after removal (FIG. 12B)
Figure 12B:
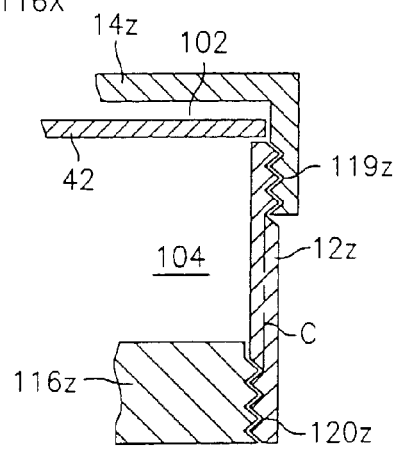

In the alternative embodiments of FIGS. 12A and 12B, the need to flare out the bottom of the base 12 is eliminated. In FIG. 12A, the base 12y receives a bottom cover 116y that includes an overlapping portion 117y, the outer surface 118y of which is of equal dimension to the outer surface 118y of which is of equal dimension to the outer wall of the base 12y, such that covers 14y and 11y can be slidably engaged to form a mini-storage unit for the disc media. In FIG. 12B, the base 12z has an external threaded portion 119z and an internal threaded portion 120z each of which extends beyond the center line "C" of the wall of the base 12z. In this way, when the covers 14z and 116z are removed, they can be threadably engaged to form a mini-storage unit for the disc media.

Figure 13:
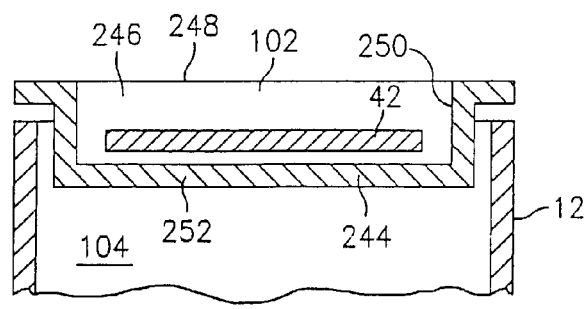
FIG. 13 is a cut-away, cross-sectional side view of another embodiment of the present invention in which a concave cavity on the exterior side of the cover for the device forms the first chamber for the disc media and a seal encloses the disc media within the concave cavity.

FIG. 13 shows a further alternative embodiment, wherein the cover 244 nestingly seats within the base 12 and the disc shaped media 42 is placed within the concave recess 246 of the cover 244. A seal 248 made of plastic or other suitable material is applied to the cover 244 to hold the disc shaped media within the cover 244 until the seal is removed by the user. The disc shaped media can be retained against movement within the cover 244 as a result of contact with the side walls 250, bottom wall 252 and seal 248, or by utilization of any of the other methods taught herein.

Figure 14:
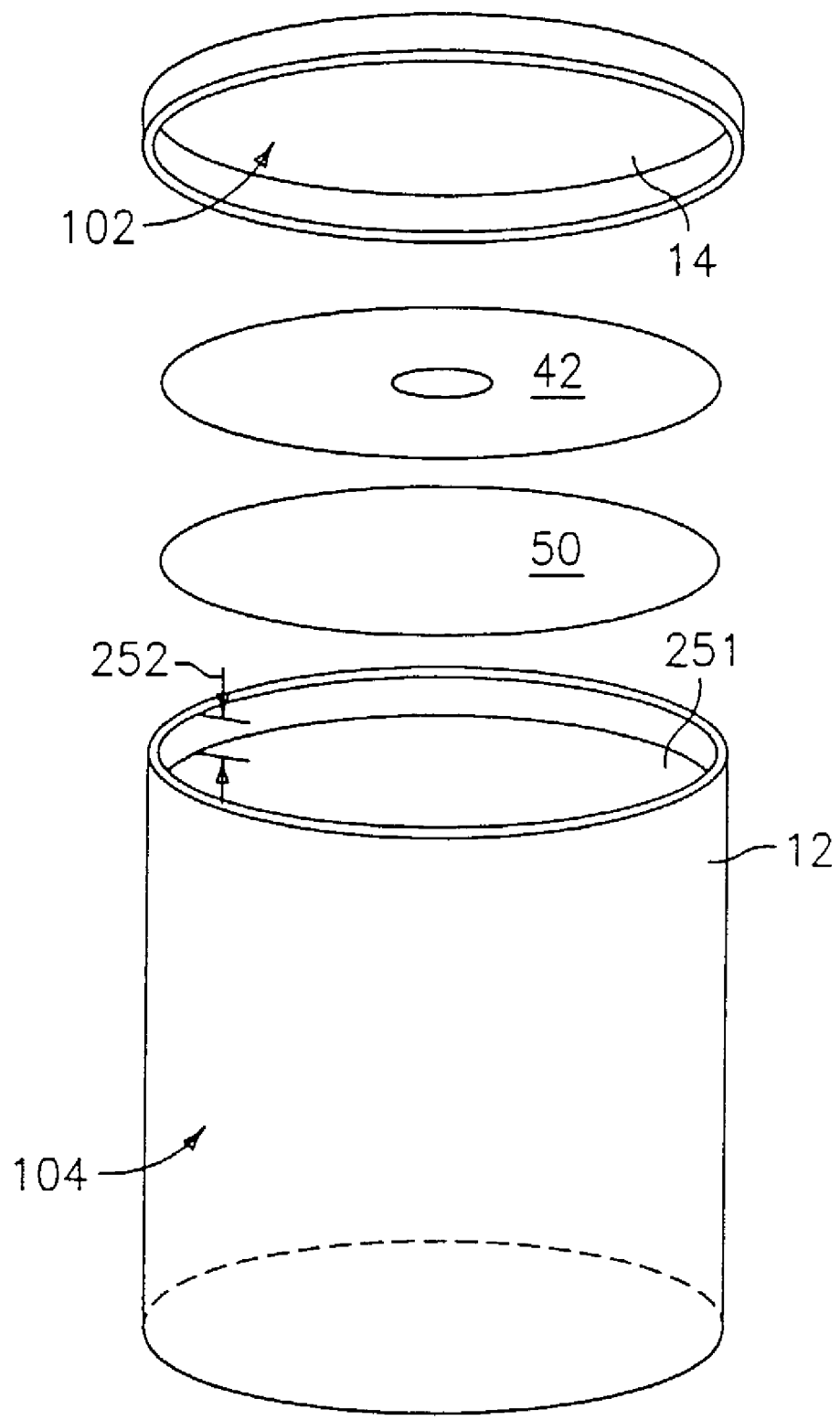
FIG. 14 is an exploded perspective view of a further alternative embodiment of the novel disc packaging device of the present invention with the lid, disk media and protective element removed, illustrating the use of a sealed base.

FIG. 14 shows a further alternative embodiment wherein the base 12 is a separately manufactured container of miscellaneous content, that includes a slightly concave end 251, the depth 252 of which exceeds the combined thickness of a disc shaped media 42 and a protective element 50 which are seated within the concave end 251 and held there by cover 14 which snaps onto base 12. In an alternate embodiment, a protective element is not used or the disc shaped media is packaged in an envelope (not shown).

Figure 15:
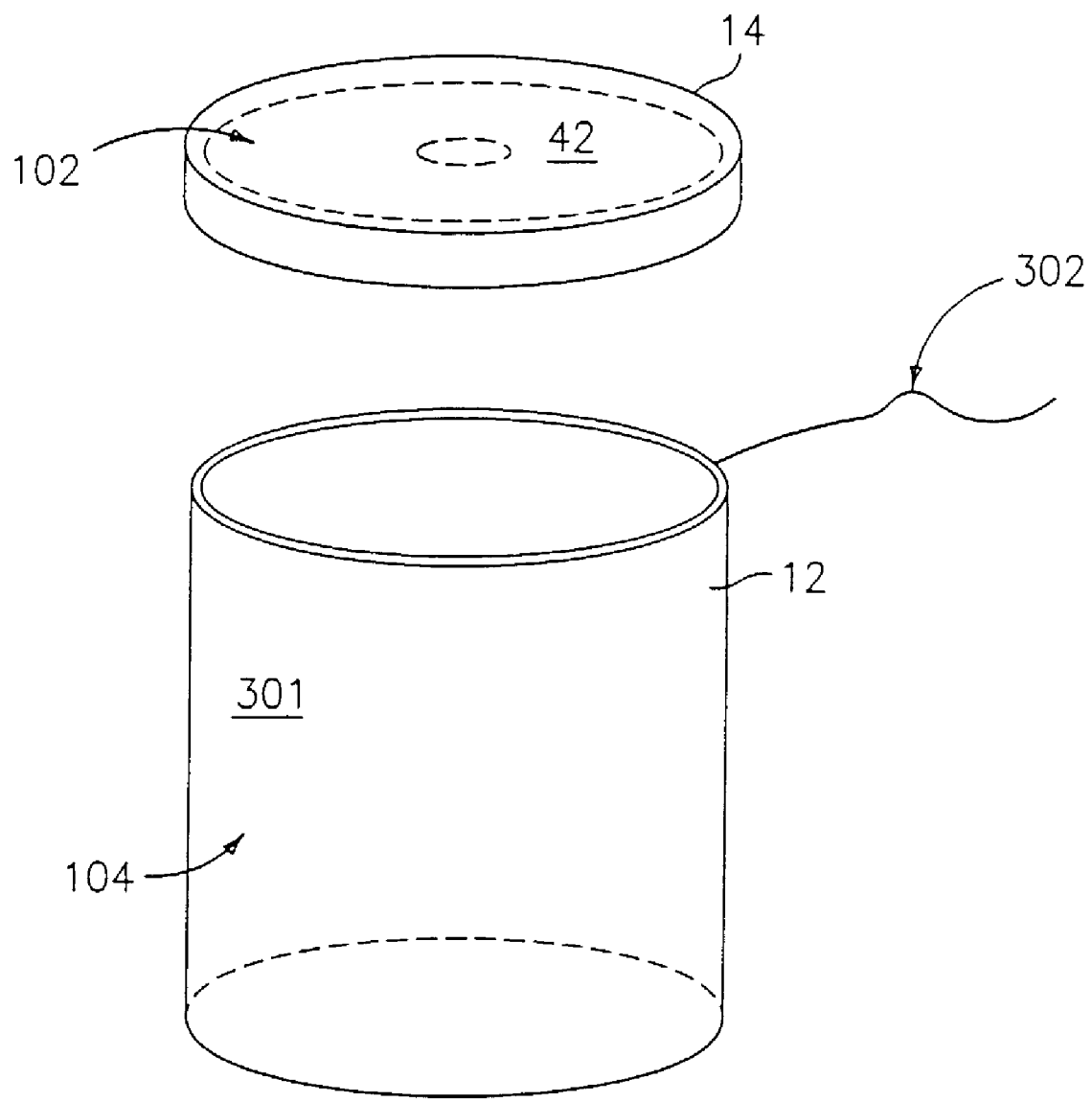
FIG. 15 is an exploded perspective view of a further alternative embodiment of the novel disc packaging device of the present invention in which the disk media is sealed within the lid, and the base is separately sealed, and the lid and base are detachably joined together by an outer packaging skin that can be severed with a pull string.

FIG. 15 shows a further alternative embodiment wherein the disc shaped media is mounted and sealed within cover 14, e.g., as taught herein in connection with other embodiments, and cover 14 is attached to base 12 by paper packaging material skin that binds the cover 14 and base 12 together. Cover 14 is separated from base 12 by pulling string 302 which tears the skin 301 and brakes the circumferential attachment between cover 14 and base 12.

It would be understood that in each embodiment, a container device is provided in which disc shaped media can be packaged, distributed, displayed at retail and, if desired, restored with other materials and that, in effecting such usage, discrete chambers are provided for the disc media and for the other materials so as to prevent contact between the disc media and the other materials. In the embodiments shown in FIGS. 1 through 6B, the inner structure, whether it is the annular collar of FIG. 1, or the discretely positioned abutment/protrusion clips of FIG. 3, or the upstanding rim in FIG. 3B, or the lid and supplemental lid of FIG. 3C, or the "spider" structure of FIG. 4, or the "trap" structure of FIG. 5, in each case is located in and helps define a first chamber in the lower base component 12. Underneath this first chamber is a second chamber. The first chamber receives and securely holds, despite repeated removal and re-packaging, the disc shaped media. The second chamber receives the other materials and keeps these materials separate from the disc shaped media. The need for a separate "jewel case" for the disc shaped media is thus completely eliminated.

It would be understood that the shape of the container can be varied without departing from the scope of the present invention, e.g., the cylindrical base 12 can be square or rectangular so long as the outer wall of the collar 40 corresponds and the collar includes spacers from the outer wall of the collar to the annular ring and annular lip of the present invention. Similar adjustments could be made to the other embodiments as would be apparent to those skilled in the an having reviewed this disclosure. The abutment/protrusions clips of FIG. 3 could be mounted on a non-cylindrical shaped base, as could the spider structure of FIG. 4 or the trap structure of FIG. 5.

It would be understood by those skilled in the art that the function of the annular ring of FIG. 1 or the abutments of FIG. 2 could be performed by an appropriately dimensioned inner wall 26 of the container 12.

It would be further understood that while several methods of attaching the annular collar of FIG. 1, the abutment/protrusion clips of FIG. 2, the spider structure of FIG. 3 and the trap structure of FIG. 4 have been shown, those skilled in the alt after having reviewed this disclosure could devise other means of attachment without departing from the scope of the present invention.

It would be further understood by those skilled in the art that the device and method of this invention can accommodate one or more disc shaped media, e.g., through the insertion of protective elements therebetween.

Illustrated in FIGS. 16–18 is another embodiment of the present invention having a lid 400 adapted to receive the disc-shaped media 42, which lid is further adapted to be received by and retained within a cylindrical plug container 402 having an opening 404 therein. Toward that end, the outer diameter of lid 400 is slightly less than the diameter of the opening 404.

A center lid support structure 406 is provided in the center of lid 400 for receiving and retaining the disc-shaped media 42. Said lid support structure 406 includes at least one support projection 408 which extends from the inside surface 410 of the lid 400. These projections 408 are adapted to be inserted within the central annular aperture 412 of the disc-shaped media 42 such that the disc-shaped media 42 is prevented from moving linearly either perpendicularly or parallel to the plane of the disc-shaped media 42, while allowing the disc-shaped media 42 to rotate around the lid support structure 406.

Lid 400 is partially retained within plug container 402 by means of arcuate lip 414 which engages a corresponding indentation 416 in lid 400, such that lid 400 must be inserted into plug container 402 at a bias wherein indentation 416 is positioned under arcuate lip 414 prior to inserting the entire lid 400 within the opening 404 in plug container 402. Said arcuate lip 414 also helps to prevent the accidental removal of lid 400 from plug container 402.

It should be appreciated that lid 400 fits within the opening 404 of plug container 402 such that the outer rim 418 of lid 400 comes in contact with the inner surface 420 of the plug container 402. Lid 400 is prevented from being inserted too far into plug container 402 by means of a plurality of stop blocks 422, which engage the outer rim 418 of lid 400. Lid 400 is retained in position within plug container 402 by means of friction between outer rim 418 and inner surface 420, as well as by means of engagement of arcuate lip 414 and indentation 416.

Additional and alternative means for retaining lid 400 within plug container 402 can be employed. For example, snapping means may be provided comprising a plurality of protrusions 424 on the lid 400 which are engaged within corresponding concavities 426 in the plug container 402 when the lid 400 is inserted within the opening 404 of the plug container 402. Similarly, lid 400 may be attached to plug container 402 by means of threaded screws (not shown). In such an embodiment arcuate lip 414 and indentation 416 would no longer be necessary or practical. Additionally, the center lid support structure could be mounted on plug container 402, e.g., utilizing the means disclosed in FIGS. 4–5A, 8, 8A and 10

A flexible handle 428 is also provided on the lid 400 at the edge opposite that of the indentation 416. The handle 428 is necessary to remove the lid 400 from the plug container 402, since when the lid 400 is inserted into plug container 402, the surface of the assembled container 430 is substantially flush, such that there are no means for grasping lid 400. The handle 428 is provided at the opposite edge from the indentation 416 in order to bias the lid 400 during removal such that the indentation 416 may be slid out from under arcuate lip 414.

The assembled container 430 may be used as a plug to seal the opening of a cylindrical shipping or packaging container (not shown) containing other materials. The assembled container 430 may be inserted within such cylindrical shipping or packaging container having an inner diameter only slightly larger than the outer diameter of the assembled container 430, such that the assembled container 430 would be in frictional contact with the inner surface of the cylindrical shipping or packaging container. An annular collar 432 may be provided on the upper portion of the plug container 402 in order to limit the extent of insertion of the assembled container 430 into the cylindrical shipping or packaging container and to protect the rim of the cylindrical shipping or packaging container against damage.

A variety of additional and alternative means exist for retaining the assembled container 430 within the cylindrical shipping or packaging container during transport and storage thereof. For example, a plurality of annular fins 434 are shown which may be provided on the outer surface of the assembled container 430, which fins 434 engage the inner surface of the cylindrical shipping or packaging container. Alternatively, the assembled container 430 may be screwed or snapped into the cylindrical shipping or packaging container or be retained therein by some adhesive means e.g., a plastic sleeve or "safety seal" that is shrink wrapped over the collar 432 of the assembled container 430 and the side of the cylindrical shipping and packaging container, or it may be lightly restrained by the friction between the outer walls of the assembled container 430 as inserted against the inner walls of the cylindrical packaging or shipping container.

The novel packaging device shown in FIGS. 16–18, when combined with a cylindrical container, is particularly well suited as a storage container for a disc media and related material, such as children's building blocks and a related CD ROM. After use, the building blocks can be easily deposited in the cylindrical container, the CD ROM re-mounted on lid 400 which is re-inserted within the plug 402, and the assembled container 430 re-inserted within the cylindrical container to seal the container. In this manner, the packaging device makes an effective and attractive storage container that can be maintained on shelves in children's rooms.

Illustrated in FIGS. 19A–20C is another embodiment of the present invention comprising a plug container 500 including an upper compartment 502 and a lower chamber 504, said chambers being of complementary size and shape such that when said plug container 500 is in a closed position (as illustrated in FIGS. 16B, 16C, 17B and 17C), said chambers 502 and 504 are disposed immediately adjacent to each other so as to form a relatively secure cavity or first chamber 506 within which the disc-shaped media 52 may be safely stored. The preferred method of securing said upper compartment 502 to said lower chamber 504 is by nesting one within the other. To accomplish said purpose, either said upper compartment 502 or said lower chamber 504 is made somewhat smaller than its opposite, such that the smaller of the two chambers 502, 504 may nest inside the larger of the two chambers 502, 504. In the preferred embodiment, as illustrated in FIGS. 19A–20C, the upper compartment 502 is somewhat smaller than the lower chamber 504, wherein the outer perimeter of the upper compartment 502 has substantially the same diameter as the inner surface of the lower chamber 504 such that the upper compartment 502 fits snugly within the lower chamber 504, allowing friction to keep the two chambers 502, 504 together. It should be appreciated, however, that other means for joining the two chambers 502, 504 exist, such as clasps or snaps, which means would be more appropriate if the two chambers 502, 504 were to have substantially the same diameter.

The chambers 502, 504 are attached by means of a flexible hinge 508 disposed at the edges thereof, which hinge 508 allows the plug container 500 to be opened by separating the upper compartment 502 from the lower chamber 504 so as to gain access to the cavity or first chamber 506 and the disc-media 52 stored therein, and closed by nesting the smaller of the two chambers 502, 504 into the larger. Said hinge 508 in the preferred embodiment is just wide and long enough so as to provide adequate support and sufficient space to allow the two compartments 502, 504 to engage and disengage each other, but remain as unobtrusive and unobstructive as possible. Inasmuch as the plug container 500 is, in the preferred embodiment, designed to close and seal a container 12, it is imperative that the hinge 508 not interrupt the circumference of the plug container 500, particularly the lower portion 510 of the plug container 500, which lower portion 510 sits within the opening of container 12.

The plug container 500 may be used as a plug to seal the opening of a cylindrical shipping or packaging container (not shown) containing other materials. The plug container 500 may be inserted within such cylindrical shipping or packaging container having an inner diameter only slightly larger than the outer diameter of the lower portion 510 of the plug container 500, such that the plug container 500 would be in frictional contact with the inner surface of the cylindrical shipping or packaging container. An annular collar 512 may be provided on the upper portion of the plug container 500 in order to limit the extent of insertion of the plug container 500 into the cylindrical shipping or packaging container and to protect the rim of the cylindrical shipping or packaging container against damage.

A variety of additional and alternative means exist for retaining the plug container 500 within the cylindrical shipping or packaging container during transport and storage thereof. For example, a plurality of annular fins 514 are shown which may be provided on the outer surface of the lower portion 510 of the plug container 500, which fins 514 engage the inner surface of the cylindrical shipping or packaging container. Alternatively, the plug container 500 may be screwed or snapped into the cylindrical shipping or packaging container or be retained therein by some adhesive means e.g., a plastic sleeve or "safety seal" that is shrink wrapped over the plug container 500 and the side of the cylindrical shipping and packaging container, or it may be lightly restrained by the friction between the outer walls of the plug container 500 as inserted against the inner walls of the cylindrical packaging or shipping container.

Figure 19A:
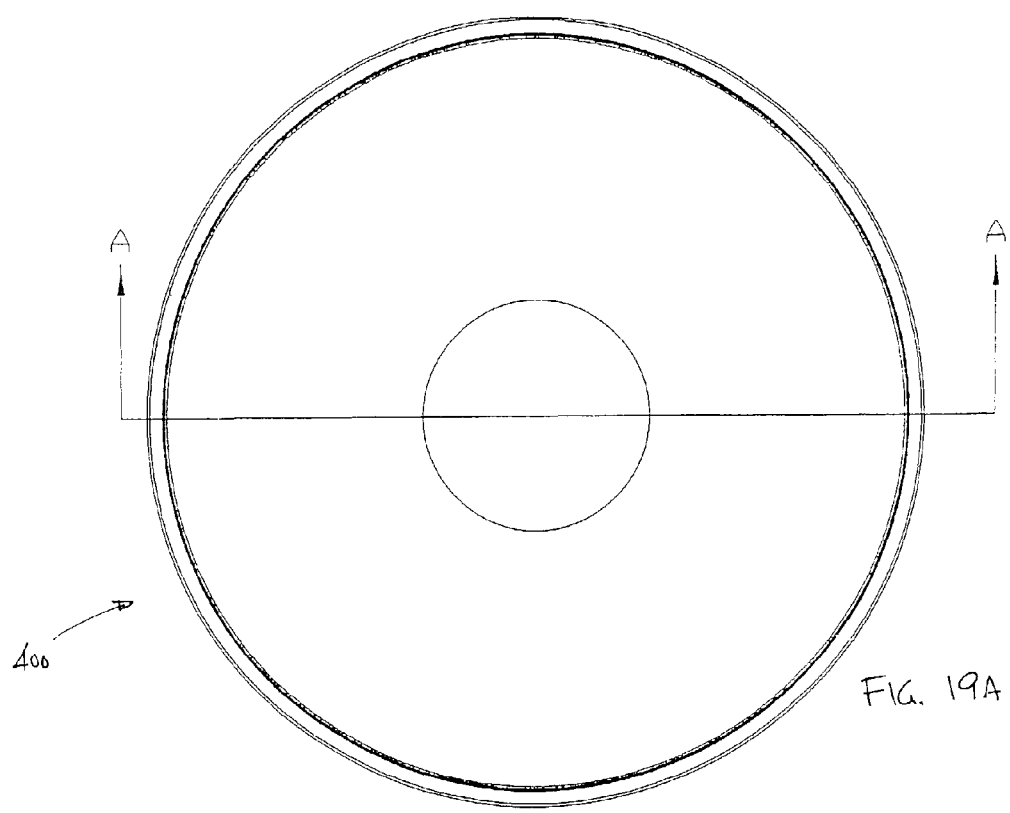
FIG. 19A is a top elevational view of another embodiment of the novel disc packaging device of the present invention in which the disc media is retained in the bottom chamber of a clam-shell first member, which first member is engaged and retained within the container and serves as a cover or seal thereto.
Figure 19B:
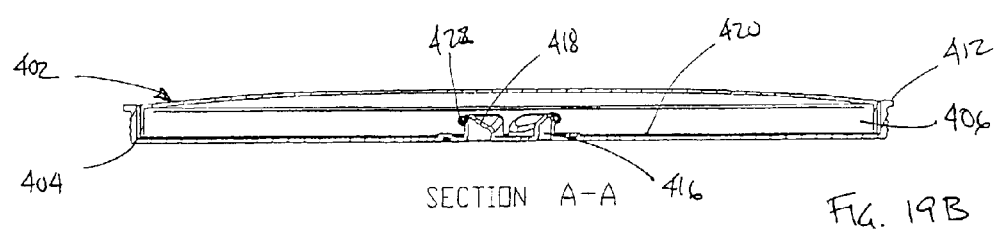
FIG. 19B is a cross-sectional view of the embodiment of FIG. 19A.
Figure 19C:
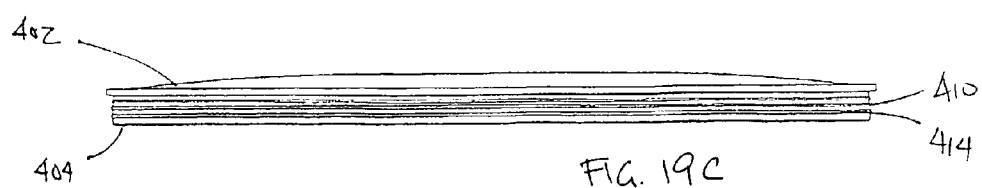
FIG. 19C is a side elevational view of the embodiment of FIG. 19A.

A center support structure 516 is provided in the center of either the upper compartment 502 (as shown in FIGS. 19B, 19D and 19E) or the lower compartment 504 (as shown in FIGS. 20B, 20D and 20E) for receiving and retaining the disc-shaped media 52. Said center support structure 516 includes at least one support projection 518 which extends from the inside surface 520 of either compartment 502, 504. These projections 518 are adapted to be inserted within the central annular aperture of the disc-shaped media 52 such that the disc-shaped media 52 is prevented from moving linearly either perpendicularly or parallel to the plane of the disc-shaped media 52, while allowing the disc-shaped media 52 to rotate around the center support structure 516. In the preferred embodiment, at least one raised protrusion 522 is disposed on the end of the center support structure 516, which protrusion 522 serves to retain the disc-shaped media 52 in place over the center support structure 516, while allowing the disc-shaped media 52 to freely rotate.

Figure 21:
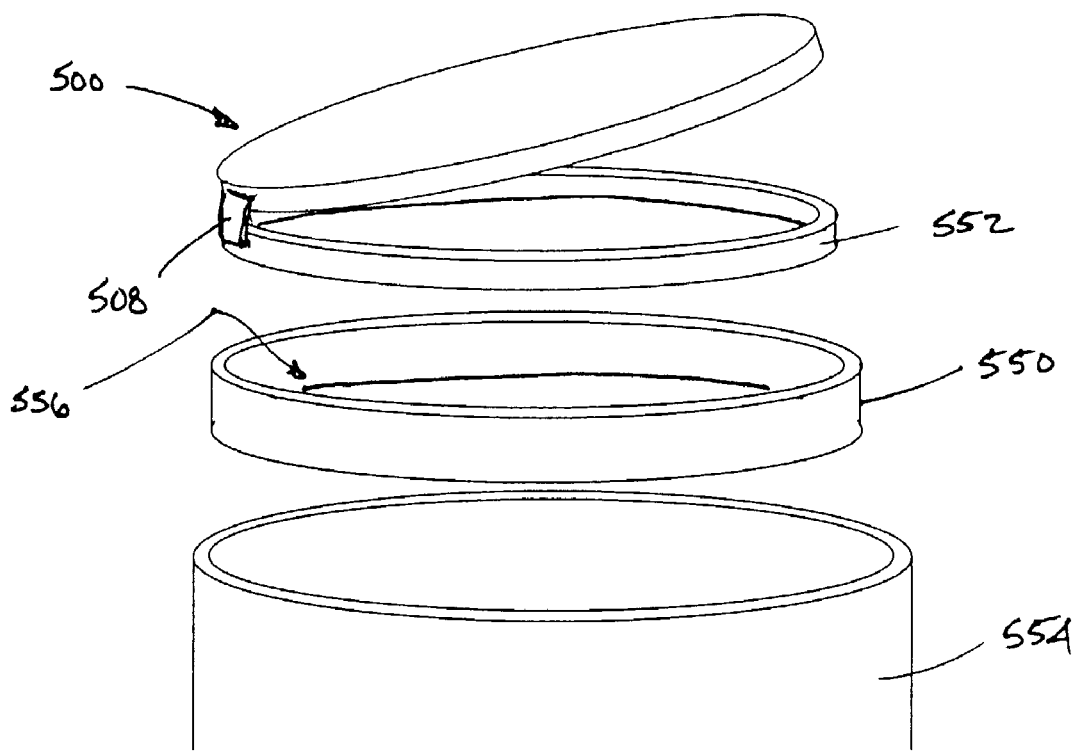
FIG. 21 is a perspective view of an alternate embodiment of the novel disc packaging device of the present invention in which the plug member is stored in a preliminary plug, which is designed to be inserted into and substantially seal the opening of a container.

In an alternative embodiment, as illustrated in FIG. 21, the plug container 500 may consist of two separate components, a preliminary plug 550 and the clam-shell member 552. The preliminary plug 550 is designed to be inserted into and substantially seal the opening of the container 554, while providing a plug chamber 556 adapted for receiving the clam-shell member 552. But for the fact that it is the preliminary plug 550 and not the clam-shell member 552 that serves to seal the opening of the container 554, the clam-shell member 552 is in all other respects identical to the plug container 500, albeit of a slightly smaller diameter so as to fit within the preliminary plug 550.

Figure 22:
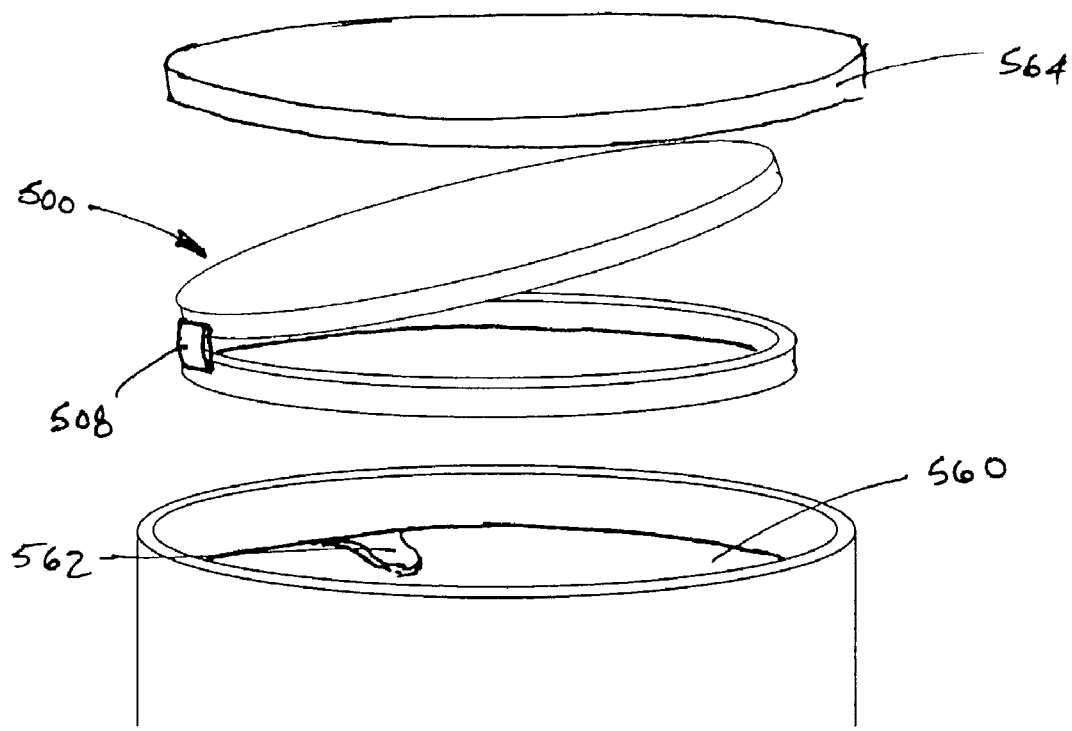
FIG. 22 is an exploded perspective view of yet another alternate embodiment of the novel disc packaging device of the present invention in which the plug container sits above a temporary container seal.

In yet another alternative embodiment, as illustrated in FIG. 22, the plug container 500 may be situated above a temporary container seal 560, which temporary container seal 560 serves to secure the materials stored within the container until such time that access is required thereto, at which time the temporary container seal is removed 560 (either by means of a pull tab 562, or otherwise). The plug container 500 in such embodiment rests on top of said temporary container seal 560, and is prevented from separating therefrom in one embodimentby a container lid 562. When access to the contents of the container are desired, the container lid 562 and plug container 500 are removed, and the temporary container seal 560 is withdrawn. If all of the contents of the container are not consumed, the container lid 564 may be reapplied so as to secure the contents within the container. In an alternate embodiment, the plug container 500 can be held on the container seal 560 by a safety seal (not shown) and, in a still further alternate embodiment, the plug container 500 can be reapplied to the container after the safety seal and temporary container seal 560 have been removed to secure non-consumed contents within the container.

The novel packaging device shown in FIGS. 19A–22, when combined with a cylindrical container, is particularly well suited as a storage container for a disc media and other material. After removing the other material from the cylindrical container, the disc-shaped media 52 may be permanently stored in the plug container 500, which makes an attractive and secure storage device for the disc-shaped media. Alternatively, if other materials remain in the cylindrical container, the plug container 500 may be used to reseal said materials within the container. In this manner, the packaging device makes an effective and attractive storage container. Illustrated in FIGS. 23–26 is yet another embodiment of the present invention comprising a container 600 including a first container element 602 and a second container element 604, said container elements 602, 604 being of complementary size and shape such that when said container 600 is in a closed position (as illustrated in FIG. 23A), said container elements 602 and 604 are disposed immediately adjacent to each other so as to form a relatively secure cavity or first chamber 606 within which materials may be safely stored. The preferred method of securing said first container element 602 to said second container element 604 is by nesting one within the other. To accomplish said purpose, either said first container element 602 or said second container element 604 is made somewhat smaller than its opposite, such that the smaller of the two container elements 602, 604 may nest inside the larger of the two container elements 602, 604. In the preferred embodiment, as illustrated in FIG. 23A first container element 602 is somewhat smaller than the second container element 604 such that the first container element 602 fits snugly within the second container element 604, allowing friction to keep the two container elements 602, 604 together. Means may be provided on the first and second container elements 602, 604 for interlocking the two elements, such as an indentation 608 on the first container element 602 which is designed to receive a corresponding raised rim 610 on the second container element 604 by means of a snap fit or compression fit. It should be appreciated, however, that other means for joining the two container elements 602, 604 exist, such as clasps or snaps, which means would be more appropriate, for example, if the two container elements 602, 604 were to have substantially the same diameter.

Figure 25:
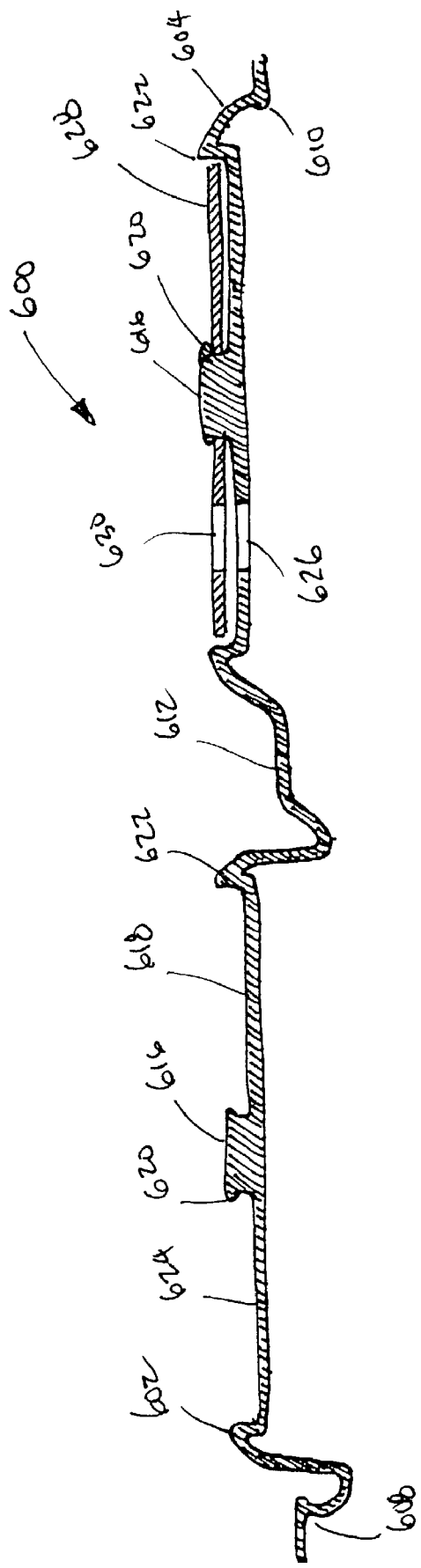
FIG. 25 is a cross-sectional view of an alternative embodiment of FIG. 24 in which an opening is provided in the container and a sealing member is further provided to cover said opening, which sealing member may include an opening that corresponds to the opening in the container such that access is provided into the chamber by aligning the two openings.

As seen in FIGS. 23–25, convex element 609 flattens and concave element 611 flexes outward when the container elements 602, 604 are in a closed position to conform with each other, as shown in area 613. The container elements 602, 604 in such figure are attached by means of an option flexible hinge 612 disposed at the edges thereof, which hinge 612 allows the container 600 to be opened by separating the first container element 602 from the second container element 604 so as to gain access to the cavity or first chamber 606 and the materials stored therein, and closed by nesting the smaller of the two container elements 602, 604 into the larger. Said hinge 612 in the preferred embodiment is just wide and long enough so as to provide adequate support and sufficient space to allow the two container elements 602, 604 to engage and disengage each other, but remain as unobtrusive and unobstructive as possible.

In the preferred embodiment, the hinge 612 also operates to provide a loop 614 when said container 600 is in the closed position through which a rope, string or lanyard (not shown) may be inserted so as to provide a convenient means to carry the container 600 (as illustrated in FIG. 23A). Alternatively, the container elements 602, 604 can be two separate elements 615, 617 having extensions that mate together to form the loop 614 as shown in FIG. 23B An individual may tie the lanyard around his or her neck, thus resulting in the container 600 being a necklace. Alternatively, the container 600 may be hung off an individual's wrist, around his or her waist, across the shoulders, or any number of other carrying means. It should be appreciated, however, that the hinge 612 must therefore be stiff yet flexible enough so that it may be bent so as to form the loop 614 while still retaining its shape. In the preferred embodiment, the entire container 600 is composed of a transparent or translucent plastic and is formed in one piece. However, other materials, such as Lucite or cardboard would suffice. As has been described, the invention can also be accomplished with two piece construction.

At least one center support structure 616 is provided on the external surface 618 of the container 600 for receiving and retaining the disc-shaped media 42 on a platform 624. In the preferred embodiment, said center support structure 616 is disposed on the first container element 602, although it may be situated on the second container elements 602 or a center support structure 616 can be situated on both container elements 602, 604 (as shown in FIG. 24). The support structure 616 may include at least one protrusion 620 at the top thereof for retaining the disc-shaped media 42 on the support structure 616. The support structure 616 is adapted to be inserted within the central annular aperture of the disc-shaped media 42 such that the support structure 616 and protrusion 620 cooperate to prevent the disc-shaped media 42 from moving linearly either perpendicularly or parallel to the plane of the disc-shaped media 42, while allowing the disc-shaped media 42 to rotate around the center support structure 616.

The disc-shaped media 42 is further protected on the external surface 618 of the container 600 by means of a raised wall 622 that runs around the perimeter of the platform 624 upon which the disc-shaped media 42 sits. The diameter of the platform 624 must be at least large enough to house the disc-shaped media 42 and allow it to rotate freely. Similarly, the height of the wall 622 should be at least as great as the thickness of the disc-shaped media 42 so as to provide adequate edge protection for the disc-shaped media.

As illustrated in FIGS. 24 and 25, two support structures 616 may be provided on the external surfaces 618 on either side of the container 600. Either of said structures 616, or both, may include the protrusions 620 so as to receive and retain a disc-shaped media 42.

It should be appreciated that in the embodiments of FIGS. 23–24, the container elements 602, 604 must be separated and the container 600 opened so as to provide access to the contents of the chamber 606. Alternatively, a hole 626 may be provided through one of the platforms 624, said hole 626 serving to provide access to the chamber 606. The size of the hole 626 must be at least large enough so as to allow passage therethrough of the contents of the chamber 606, not so large that all the contents of the chamber 606 spill out simultaneously.

As seen in FIG. 25, in order to retain the contents of the chamber 606 within the chamber 606, a sealing member 628 may be attached to the support structure 616, either by means of the protrusions 620 or by other means, such as an adhesive, snap, compression fit, heat seal or otherwise. Said sealing member 628 must be removed in order to provide access to the hole 626. Alternatively, a sealing member hole 630 may be provided within the sealing member 628, which sealing member hole 630 is dimensioned in terms of size and shape relative to the hole 626 such that when the hole 626 and sealing member hole 630 are aligned, a passage is created to gain access to the chamber 606. By attaching the sealing member 628 to the container 600 by means of the support structure 616, the sealing member 628 may be allowed to rotate freely, thereby allowing the sealing member hole 630 and hole 626 to alternately be aligned so as to provide access to the chamber 606 or separated so as to close off the opening the chamber 606.

Figure 26:
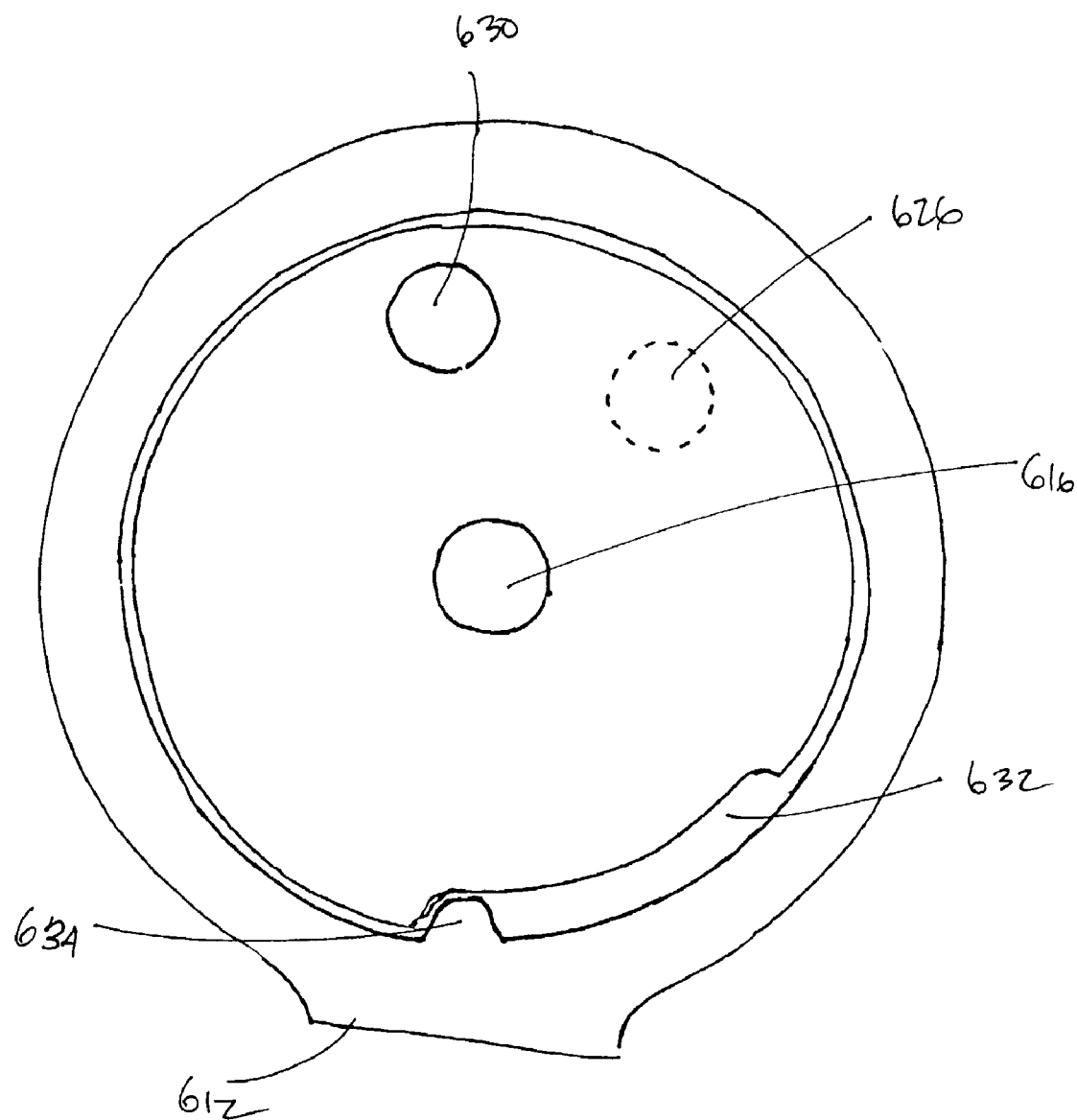
FIG. 26 is a top view of an alternative embodiment of FIG. 25 in which the sealing member is allowed to rotate so as to allow alignment of the two openings, and stops are provided so as to prevent the sealing member from rotating freely.

FIG. 26 illustrates such an embodiment in which a track 632 is provided along the perimeter of the sealing member 628 and a stop 634 is provided along the outer wall 622, which stop 634 and track 632 cooperate to limit the rotation of the sealing member 628. Said elements 632, 634 facilitate the alignment of the sealing member hole 630 and hole 626 by setting the stop 634 to stop the rotation of the sealing member 628 when the two holes 626, 630 are in alignment.

FIGS. 27A and 27B illustrate yet another embodiment in which both the disc-shaped media 42 and the sealing member 628 are received and retained by the same support structure 616. In the preferred embodiment, the sealing member 628 is applied first and retained thereon by means of either protrusions 620 on the support structure 616 or by protuberances 632 that extend from the wall 622. Of course, the order of application of the disc-shaped media 42 and the sealing member 628 may be reversed. Regardless of the order of application, however, the two elements are further retained upon the support structure 616 by means of the application of a heat seal 634. It should be appreciated that other means for sealing these elements exist, including the use of adhesives and the like.

Having thus described the invention with particular reference to the preferred forms thereof, it will be obvious that various changes and modifications can be made therein without departing from the spirit and scope of the present invention as defined by the appended claims.

What is claimed is:

1. A packaging device comprising:
   a disc-shaped media having a circular central aperture therethrough;

materials other than said disc-shaped media;
a container comprising a pair of complementary container elements joined together by interlocking means, each container element having an interior and an exterior surface, said container having an opened and a closed position, wherein said interior surfaces of said container elements cooperate to form a chamber for receiving and retaining said other materials within said chamber when said container is in the closed position; and
means for supporting and protecting said recording media upon at least one of said exterior surfaces against lineal movement in either the plane of the recording media or perpendicular to the plane of the recording media, while simultaneously allowing the recording media to rotate about the axis perpendicular to the plane of the recording media, said means for supporting and protecting said recording media is mounted on at least one of said exterior surfaces of said complementary elements, and wherein both said means for supporting and protecting said recording media and said recording media extend away from said exterior surface when said container is in the closed position, wherein said means for supporting and protecting comprises at least one upstanding surface projection mounted on and extending from said exterior surface, said surface projection adapted to be inserted into and engaged within said circular center aperture, and further wherein said at least one upstanding surface projection includes at least one protrusion, said protrusion being adapted to retain said disc-shaped media on said upstanding surface projection, while allowing said disc-shaped media to freely rotate about said upstanding surface projection.

2. The packaging device of claim 1, wherein said interlocking means comprises a flexible hinge.

3. The packaging device of claim 1, wherein said means for supporting and protecting further includes a wall to provide edge protection for said disc-shaped media.

4. A packaging device comprising:
a disc-shaped media having a circular central aperture therethrough;
materials other than said disc-shaped media;
a container comprising a pair of complementary container elements joined together by interlocking means, each container element having an interior and an exterior surface, said container having an opened and a closed position, wherein said interior surfaces of said container elements cooperate to form a chamber for receiving and retaining said other materials within said chamber when said container is in the closed position, wherein said complementary container elements comprise a first container element and a second container element, wherein said first and second container elements are generally cylindrical in shape, and wherein the diameter of said first container element is slightly less than the diameter of said second container element, and wherein at least a portion of said first container element is adapted to fit within said second container element; and
means for supporting and protecting said recording media upon at least one of said exterior surfaces against lineal movement in either the plane of the recording media or perpendicular to the plane of the recording media, while simultaneously allowing the recording media to rotate about the axis perpendicular to the plane of the recording media.

5. The packaging device of claim 4, wherein said first container element includes a recessed indentation and said second container element includes a complementary raised rim, wherein said raised rim is adapted to be received by said recessed track so as to retain said container in the closed position.

6. The packaging device of claim 5, wherein said second container element includes an opening to provide access into said chamber, and further including a removable sealing member for closing said opening, said sealing member being adapted to be repeatedly attached to and removed from said container.

7. The packaging device of claim 6, wherein said sealing member is free to rotate and includes an opening therein dimensioned in terms of size and shape relative to said opening in said second container element wherein said openings cooperate to provide access into said chamber at one preset point of rotate of said sealing member.

8. A packaging device for packaging at least one disc-shaped recording media and other materials, said device comprising:
a container comprising a pair of complementary container elements each having an interior and an exterior surface, said container having an opened and a closed position, wherein said interior surfaces of said container elements cooperate to form a chamber for receiving and retaining said other materials within said chamber when said container is in the closed position, wherein said complementary container elements comprise a first container element and a second container element joined together by interlocking means, wherein said second container element includes an opening to provide access into said chamber;
a removable sealing member for closing said opening, said sealing member being adapted to be repeatedly attached to and removed from said container, wherein said sealing member is free to rotate and includes an opening therein dimensioned in terms of size and shape relative to said opening in said second container element wherein said openings cooperate to provide access into said chamber at one preset point of rotate of said sealing member, and further wherein said sealing member includes means for attachment to said means for supporting and protecting to thereby allow said sealing member to rotate; and
means for supporting and protecting said recording media upon at least one of said exterior surface against lineal movement in either the plane of the recording media or perpendicular to the plane of the recording media, while simultaneously allowing the recording media to rotate about the axis perpendicular to the plane of the recording media.

9. The packaging device of claim 8, further including means to prevent said sealing member from rotating completely.

10. The packaging device of claim 9, wherein said means to prevent comprises a track disposed on said sealing member and a stop provided on said exterior surface, said stop engaging said track so as to allow for a limited range of rotation for said sealing member.

11. The packaging device of claim 10, wherein said means for supporting and protecting comprises at least one upstanding surface projection mounted on and extending from said exterior surface, said surface projection adapted to be inserted into and engaged by said disc-shaped media and said sealing member.

12. The packaging device of claim 11, wherein said surface projection includes at least one protrusion disposed thereon, said projection and said protrusion cooperating to retain said sealing member on said upstanding surface projection, while allowing said sealing member to freely rotate about said upstanding surface projection.

13. The packaging device of claim 12, further including a heat seal adapted to retain said disc-shaped media and said sealing member within said chamber.

14. The packaging device of claim 11, wherein said means for supporting and protecting further includes a wall to provide edge protection for said disc-shaped media, wherein at least one protuberance is disposed on said wall, said protuberance acting to retain said sealing member within said chamber, while allowing said sealing member to freely rotate.

15. The packaging device of claim 14, further including a heat seal adapted to retain said disc-shaped media and said sealing member within said chamber.

16. The packaging device of claim 11, wherein said means for supporting and protecting further includes a wall to provide edge protection for said disc-shaped media and wherein at least one protuberance is disposed on said wall, and further wherein said surface projection includes at least one protrusion disposed thereon, said protuberance acting to retain said sealing member on said upstanding surface projection and said protrusion acting to retain said disc-shaped media on said upstanding surface projection, wherein both said disc-shaped media and said sealing member are allowed to freely rotate.

17. The packaging device of claim 16, further including a heat seal adapted to retain said disc-shaped media and said sealing member within said chamber.

18. A packaging device for packaging at least one disc-shaped recording media and other materials, said device comprising:
   a container comprising a pair of complementary container elements each having an interior and an exterior surface, said container having an opened and a closed position, wherein said interior surfaces of said container elements cooperate to form a chamber for receiving and retaining said other materials within said chamber when said container is in the closed position, wherein said complementary container elements are joined together by interlocking means, said interlocking means being a flexible hinge that creates a closed loop for receiving a lanyard when said container is in the closed position; and
   means for supporting and protecting said recording media upon at least one of said exterior surfaces against lineal movement in either the plane of the recording media or perpendicular to the plane of the recording media, while simultaneously allowing the recording media to rotate about the axis perpendicular to the plane of the recording media.

19. A packaging device for packaging at least one disc-shaped recording media and other materials, said device comprising:
   a container comprising a pair of complementary container elements each having an interior and an exterior surface, said container having an opened and a closed position, wherein said interior surfaces of said container elements cooperate to form a chamber for receiving and retaining said other materials within said chamber when said container is in the closed position, wherein said complementary container elements are joined together by interlocking means, said interlocking means including extensions that create a closed loop for receiving a lanyard when said container is in the closed position; and
   means for supporting and protecting said recording media upon at least one of said exterior surfaces against lineal movement in either the plane of the recording media or perpendicular to the plane of the recording media, while simultaneously allowing the recording media to rotate about the axis perpendicular to the plane of the recording media.

20. A method for packaging a disc-shaped media having a circular center aperture and materials other than said disc-shaped media within a closed packaging device, said method comprising the steps of:
   providing a container comprising a pair of complementary container elements joined together by interlocking means, each container element having an interior and an exterior surface, said container having an opened and a closed position, wherein said interior surfaces of said container elements cooperate to form a chamber for receiving and retaining said other materials within said chamber when said container is in the closed position;
   providing means for supporting and protecting said recording media upon at least one of said exterior surfaces against lineal movement in either the plane of the recording media or perpendicular to the plane of the recording media, while simultaneously allowing the recording media to rotate about the axis perpendicular to the plane of the recording media, said means for supporting and protecting said recording media is mounted on at least one of said exterior surfaces of said complementary elements, and wherein both said means for supporting and protecting said recording media and said recording media extend away from said exterior surface when said container is in the closed position, wherein said means for supporting and protecting comprises at least one upstanding surface projection mounted on and extending from said exterior surface, said surface projection adapted to be inserted into and engaged within said circular center aperture, and further wherein said at least one upstanding surface projection includes at least one protrusion, said protrusion being adapted to retain said disc-shaped media on said upstanding surface projection, while allowing said disc-shaped media to freely rotate about said upstanding surface projection;
   inserting said materials other than said disc-shaped media within said chamber; and
   removably attaching said disc-shaped media to said means for supporting and protecting.

* * * * *